United States Patent
Ohira

(10) Patent No.: US 8,074,123 B2
(45) Date of Patent: Dec. 6, 2011

(54) MULTI-CPU FAILURE DETECTION/RECOVERY SYSTEM AND METHOD FOR THE SAME

(75) Inventor: Yoshiyuki Ohira, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 54 days.

(21) Appl. No.: 12/544,618

(22) Filed: Aug. 20, 2009

(65) Prior Publication Data

US 2009/0307526 A1    Dec. 10, 2009

Related U.S. Application Data

(63) Continuation of application No. PCT/JP2007/000211, filed on Mar. 12, 2007.

(51) Int. Cl.
*G06F 11/00* (2006.01)

(52) U.S. Cl. .............................. 714/55; 714/51

(58) Field of Classification Search .................. 714/15, 714/16, 18, 19, 49, 51, 55
See application file for complete search history.

(56) References Cited

U.S. PATENT DOCUMENTS

| | | | |
|---|---|---|---|
| 5,875,342 A * | 2/1999 | Temple | 710/260 |
| 6,269,478 B1 * | 7/2001 | Lautenbach-Lampe et al. | 717/127 |
| 6,301,676 B1 * | 10/2001 | Kumar et al. | 714/11 |
| 6,393,590 B1 * | 5/2002 | Wood et al. | 714/55 |
| 6,658,595 B1 * | 12/2003 | Thamattoor | 714/11 |
| 6,898,696 B1 * | 5/2005 | Cheong et al. | 712/228 |
| 6,961,874 B2 * | 11/2005 | Lodrige | 714/38 |
| 7,162,666 B2 * | 1/2007 | Bono | 714/51 |
| 7,219,264 B2 * | 5/2007 | Pail et al. | 714/23 |
| 7,496,800 B2 * | 2/2009 | Koto et al. | 714/51 |
| 2003/0221141 A1 * | 11/2003 | Wenisch | 714/47 |
| 2006/0031706 A1 * | 2/2006 | Ramirez | 714/1 |
| 2007/0061634 A1 * | 3/2007 | Marisetty et al. | 714/48 |
| 2007/0067143 A1 * | 3/2007 | Brenner | 702/186 |
| 2007/0088938 A1 * | 4/2007 | Codrescu et al. | 712/244 |

FOREIGN PATENT DOCUMENTS

| | | |
|---|---|---|
| JP | A 2-114364 | 4/1990 |
| JP | A 4-160642 | 6/1992 |
| JP | A 4-365145 | 12/1992 |
| JP | A 6-67901 | 3/1994 |
| JP | A 6-214889 | 8/1994 |
| JP | A 9-26888 | 1/1997 |
| JP | A 11-328131 | 11/1999 |
| JP | A 2002-7218 | 1/2002 |
| JP | A 2004-259146 | 9/2004 |

\* cited by examiner

*Primary Examiner* — Joshua Lohn
(74) *Attorney, Agent, or Firm* — Greer, Burns & Crain, Ltd.

(57) ABSTRACT

A multi-CPU system including plural CPUs, comprising a failure state detection unit for detecting a failure in an operating program, and a recovery unit for determining, when the failure state detection unit has detected a failure, whether or not recovery of data involved in the failure is possible on the basis of content of the detected failure, and for recovering the data when recovery is determined to be possible.

18 Claims, 33 Drawing Sheets

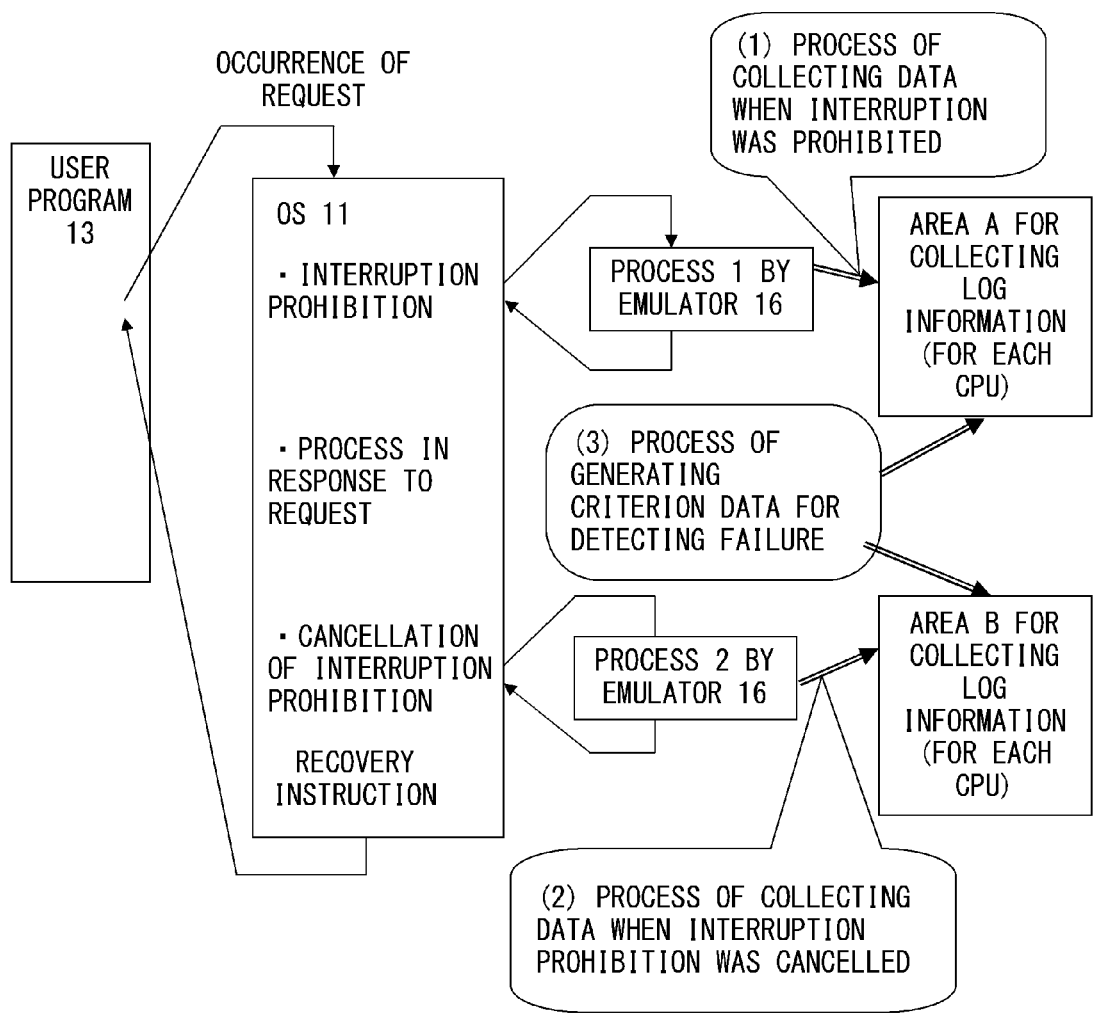
F I G. 4

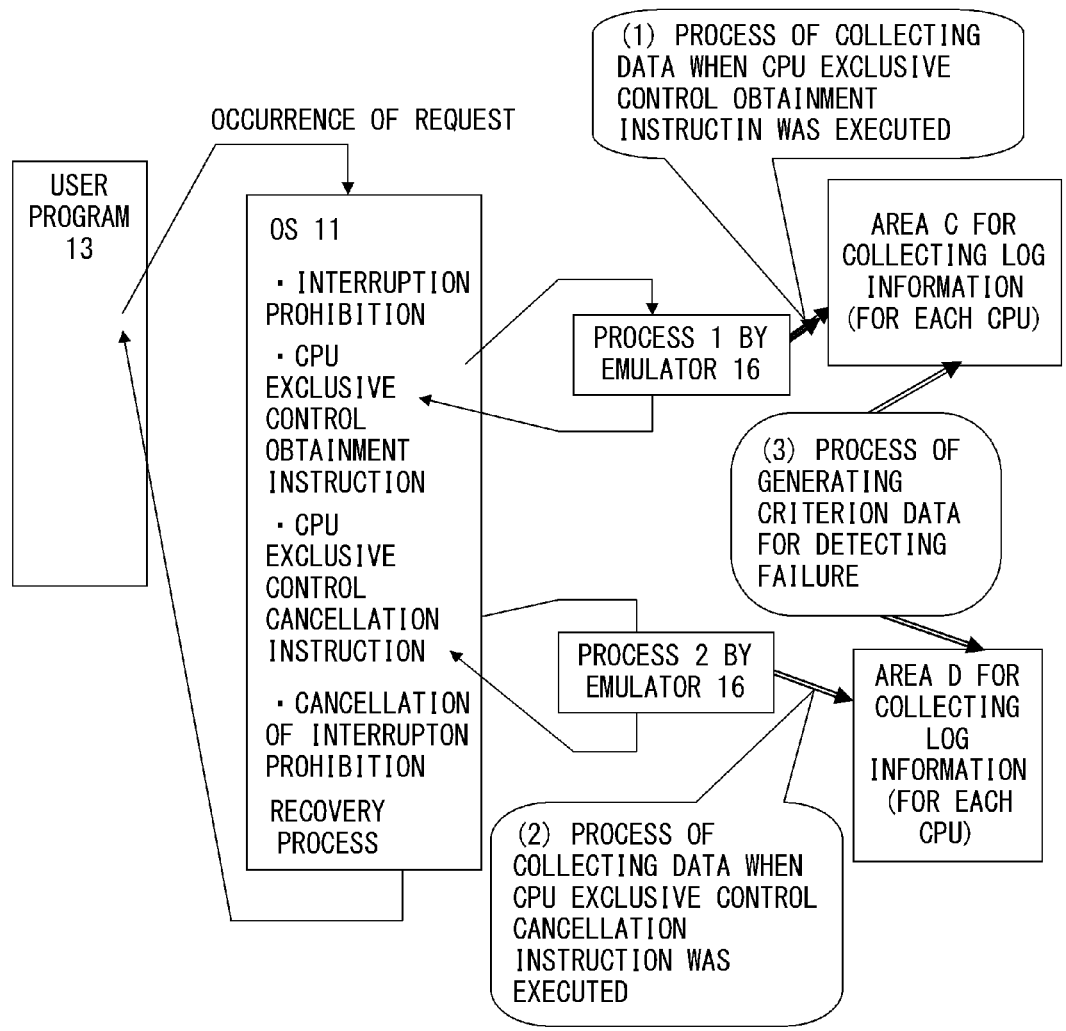
F I G. 5

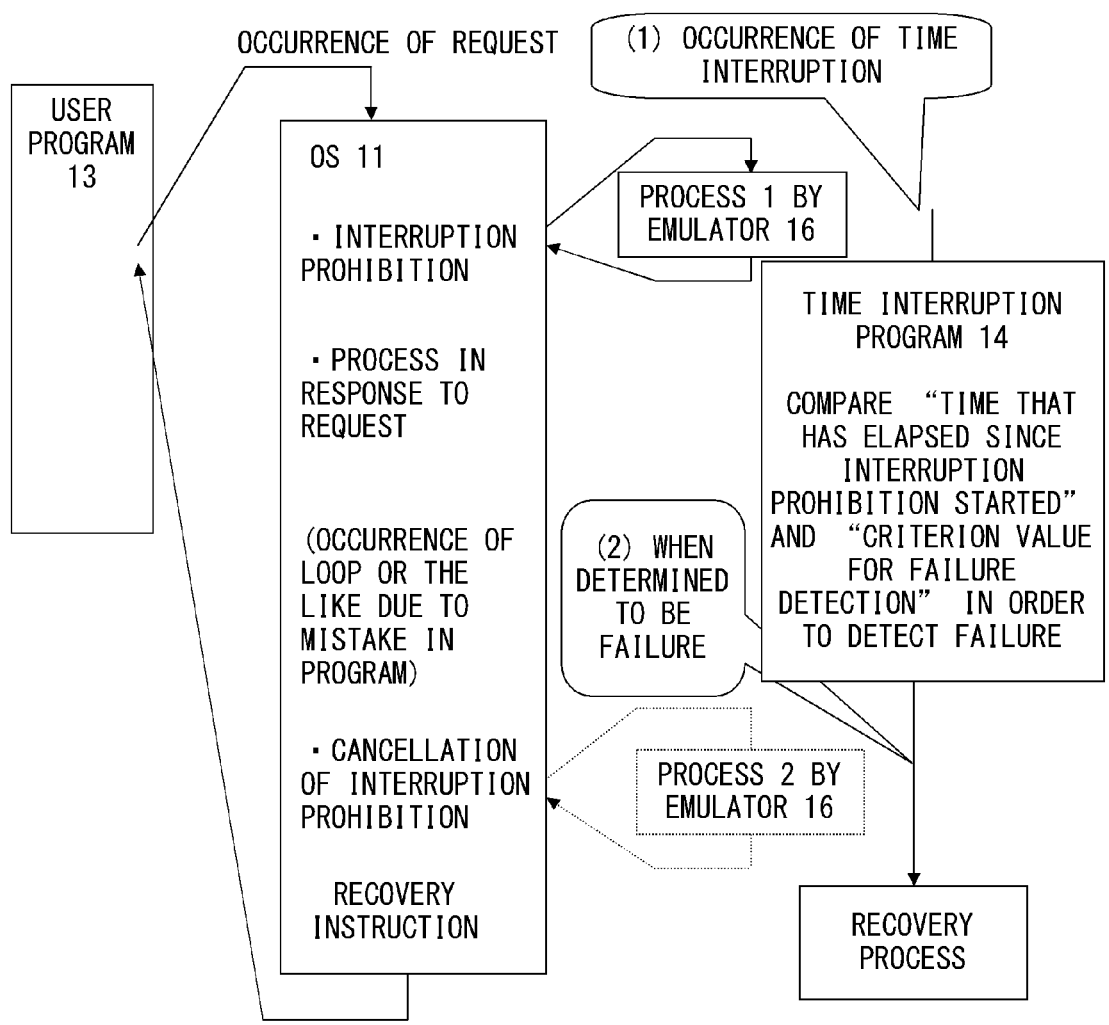
F I G. 6

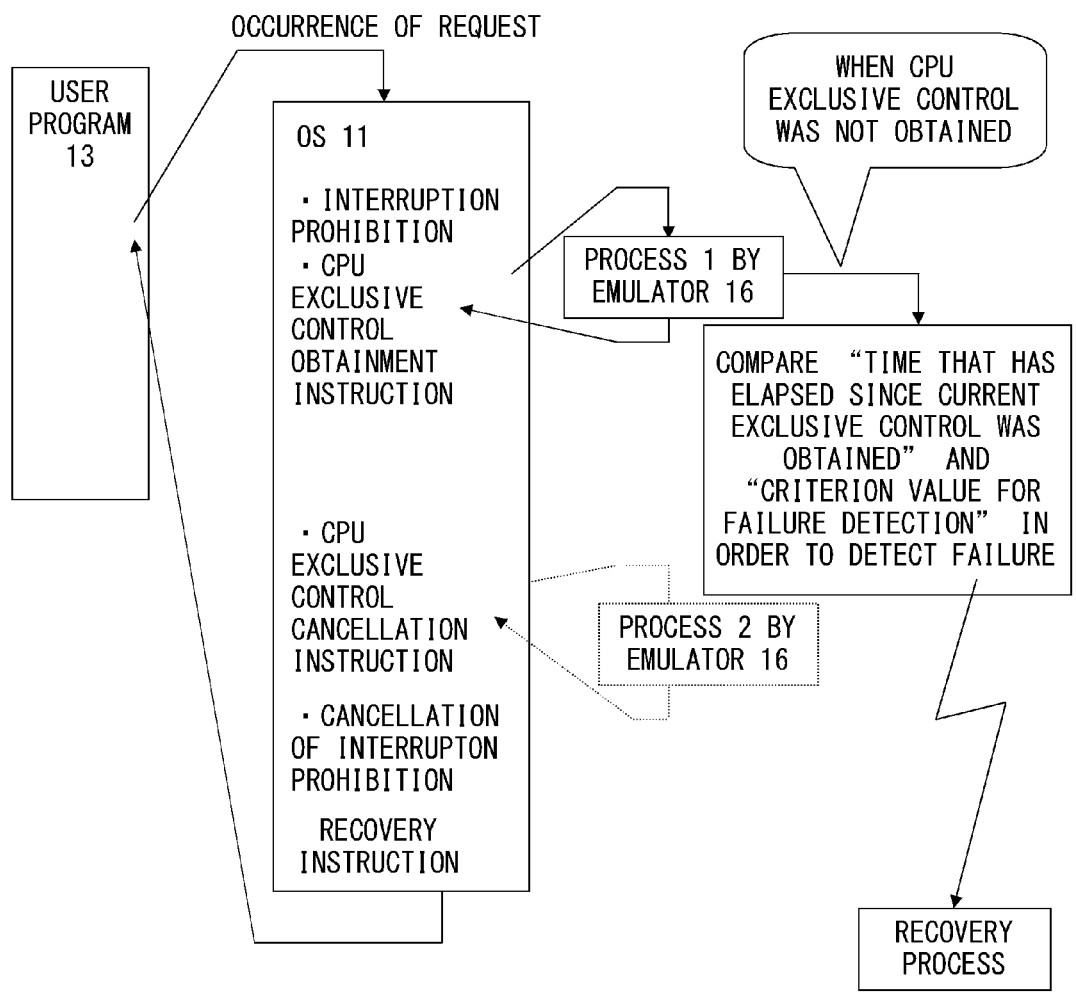
F I G. 7

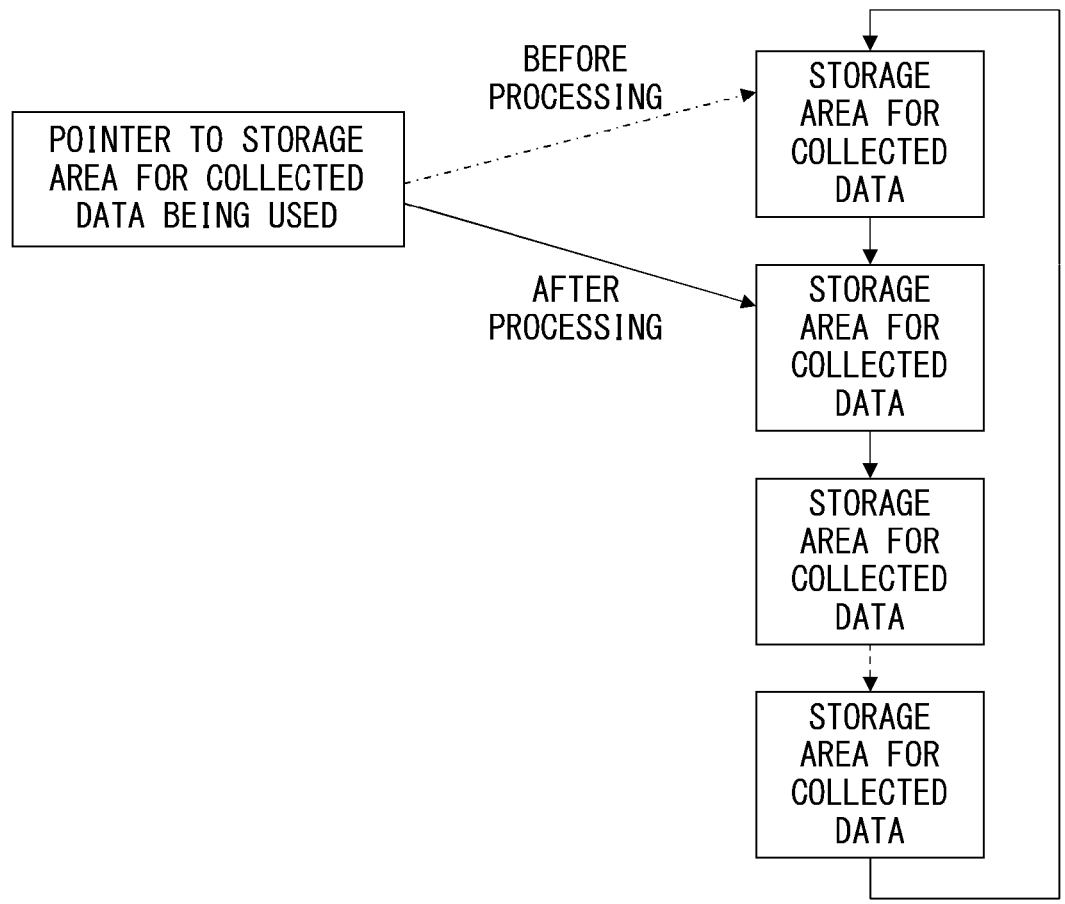
F I G. 1 6 A

| DISPLAY OF STATE | WORK AREA FOR DETECTION WHEN STARTING MONITORING FUNCTION |
|---|---|
| MAXIMUM VALUE OF COLLECTED DATA | |
| CRITERION DATA FOR DETERMINING FAILURE (STORAGE POSITION) | |

FIG. 18

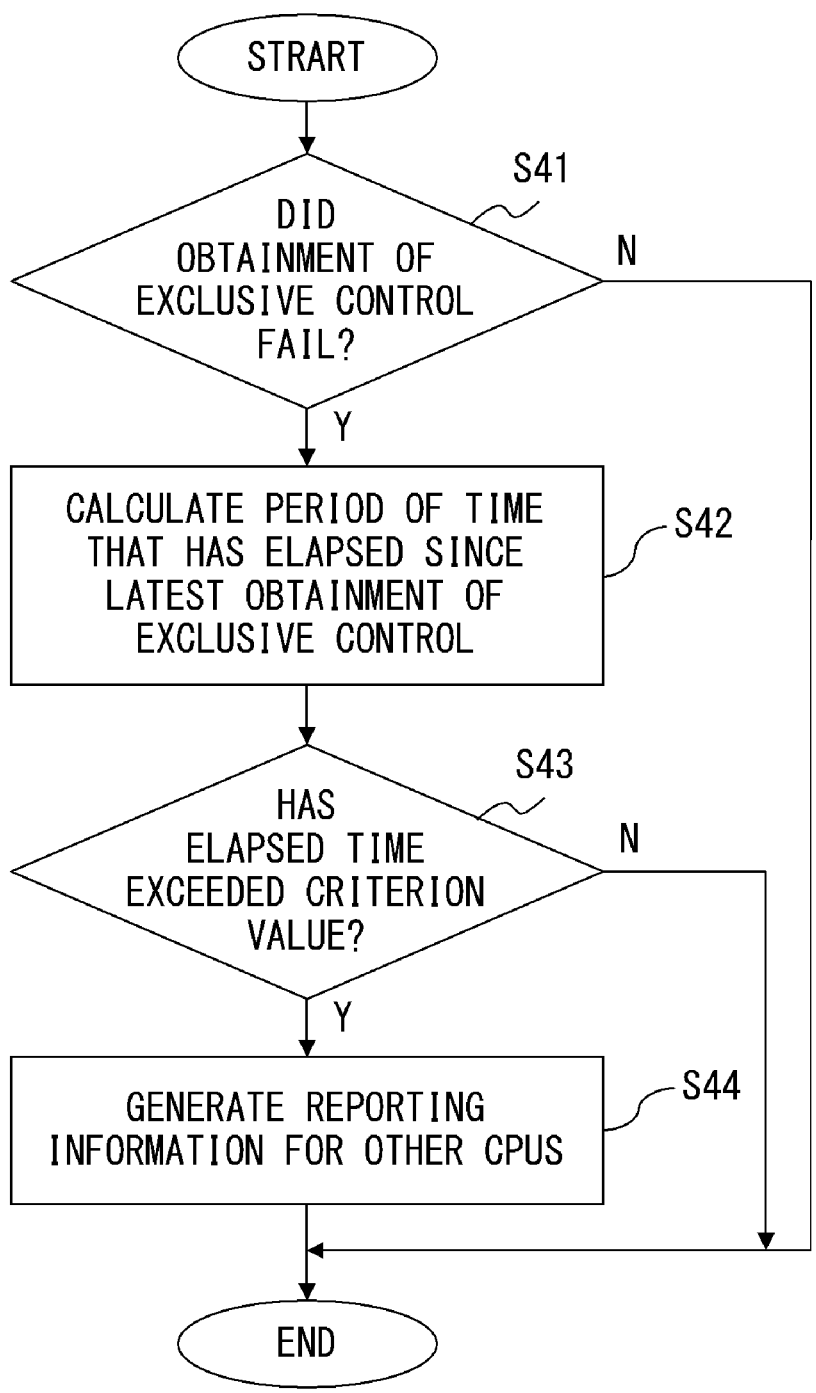
F I G. 19

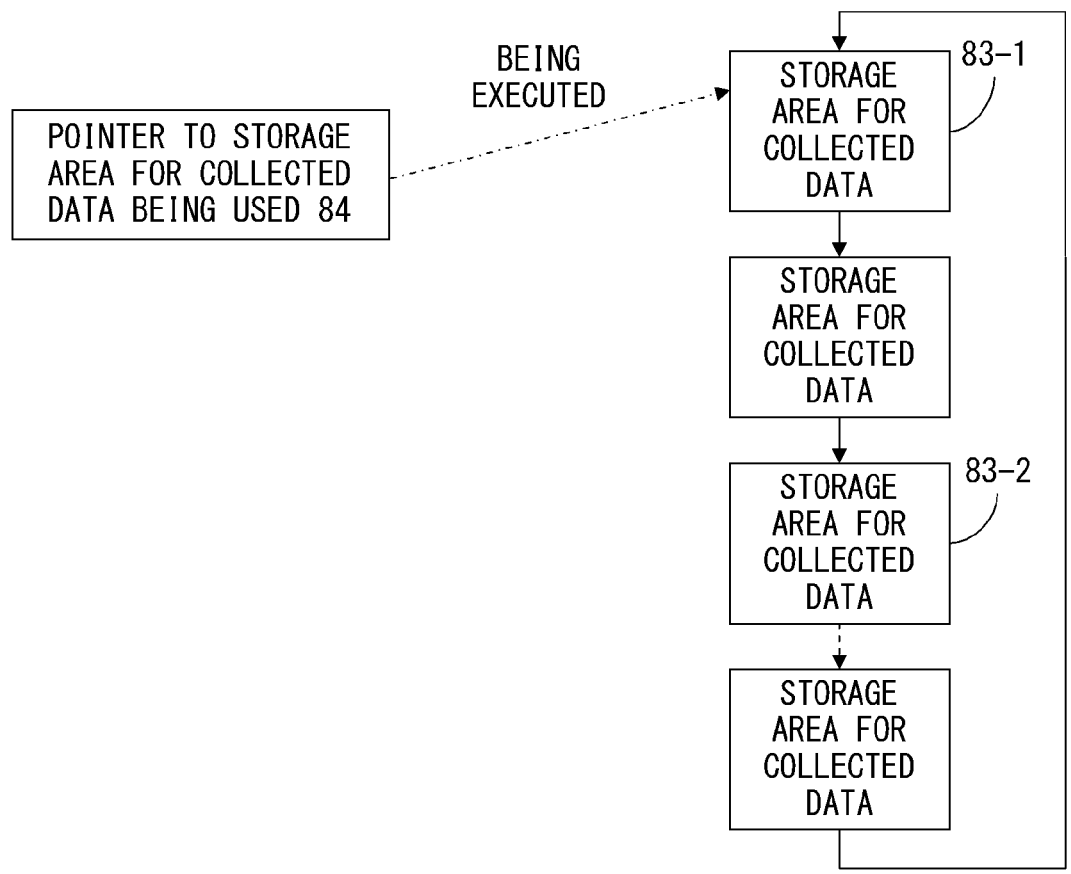
F I G. 2 4

| 91 | 92 | 93 |
|---|---|---|
| 00466D30 | 00000000 | 00000000 |
| 0FA942D0 | 00000000 | 0FA90000 |
| 00076382 | 00000000 | 00076382 |
| 0000014C | 00000000 | 00000000 |
| 0000014C | 00000000 | 00000000 |
| 30008000 | 00000000 | 00000000 |
| 0045DC40 | 00000000 | 00000000 |
| 0045DC40 | 00FFFFFF | 0045DC40 |
| 00C13840 (94) | 00000000 (95) | 00000000 (96) |
| 40000000 | 00000000 | 40000000 |
| 9FBB4100 | 00000000 | 00000000 |
| 00000000 | 00000000 | 00000000 |
| 00000000 | 00000000 | 00000000 |
| 0045DC40 | 00000000 | 00000000 |
| 00000000 | 00000000 | 00000000 |
| 00000000 | 00000000 | 00000000 |
| OMITTED | OMITTED | OMITTED |

F I G. 2 6

| 101 | 102 | 103 |
|---|---|---|
| 00466D30 | 00000000 | 00000000 |
| 0FA942D0 | 0FFF0000 | 0FA90000 |
| 00076382 | FFFFFFFF | 00076382 |
| 0000014C | FF000000 | 00000000 |
| 0000014C | FF000000 | 00000000 |
| 30008000 | 0000FFFF | 00000000 |
| 0045DC40 | FF000000 | 00000000 |
| 0045DC40 | FFFFFFFF | 0045DC40 |
| 00C13840 | 00000000 | 00000000 |
| 40000000 | 40FF0000 | 40000000 |
| 9FBB4100 | 00000000 | 00000000 |
| 00000000 | 00000000 | 00000000 |
| 00000000 | 00000000 | 00000000 |
| 0045DC40 | 00000000 | 00000000 |
| 00000000 | 00000000 | 00000000 |
| 00000000 | 00000000 | 00000000 |
| OMITTED | OMITTED | OMITTED |

FIG. 27

| 111 | 112 | 113 |
|---|---|---|
| 00466D30 | FFFFFFFF | 00000000 |
| 0FA942D0 | F000FFFF | 0FA90000 |
| 00076382 | 00000000 | 00076382 |
| 0000014C | 00FFFFFF | 00000000 |
| 0000014C | 00FFFFFF | 00000000 |
| 30008000 | FFFFF000 | 00000000 |
| 0045DC40 ~114 | 00FFFFFF | 00000000 |
| 0045DC40 | 00000000 | 0045DC40 |
| 00C13840 | FFFFFFFF | 00000000 |
| 40000000 | BF00FFFF | 40000000 |
| 9FBB4100 | FFFFFFFF | 00000000 |
| 00000000 | FFFFFFFF | 00000000 |
| 00000000 | FFFFFFFF | 00000000 |
| 0045DC40 | FFFFFFFF | 00000000 |
| 00000000 | FFFFFFFF | 00000000 |
| 00000000 | FFFFFFFF | 00000000 |
| OMITTED | OMITTED | OMITTED |

FIG. 28

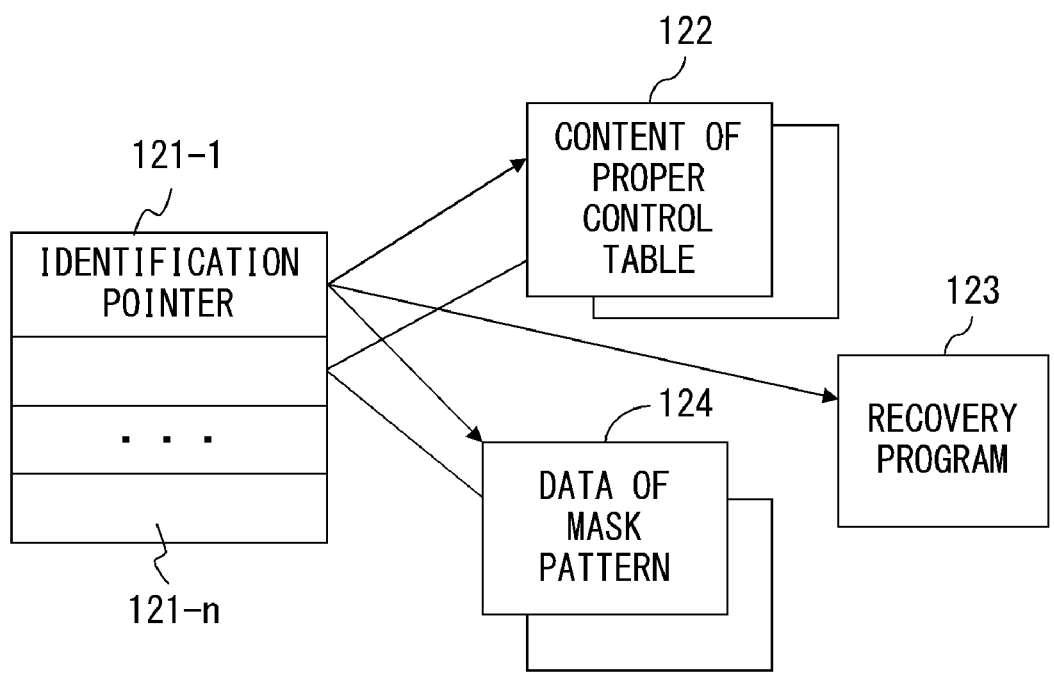
F I G. 29A

| IDENTIFICATION CODE OF DETECTED FAILURE | INFORMATION OF PROCESS TARGET RESOURCE |
|---|---|
| ADDRESS OF PROCESS TARGET RESOURCE | |
| ADDRESS OF MASK PATTERN DATA (AUTOMATIC RECOVERY IS IMPOSSIBLE) | |
| ADDRESS OF MASK PATTERN DATA (WHETHER OR NOT RECOVERY IS NEEDED) | |
| ADDRESS OF MASK PATTERN DATA (PART THAT DOES NOT NEED RECOVERY) | |
| RECOVERY DATA ADDRESS (CONTENT OF PROPER CONTROL TABLE) | |
| ENTRY ADDRESS OF RECOVERY PROGRAM | |

FIG. 29B

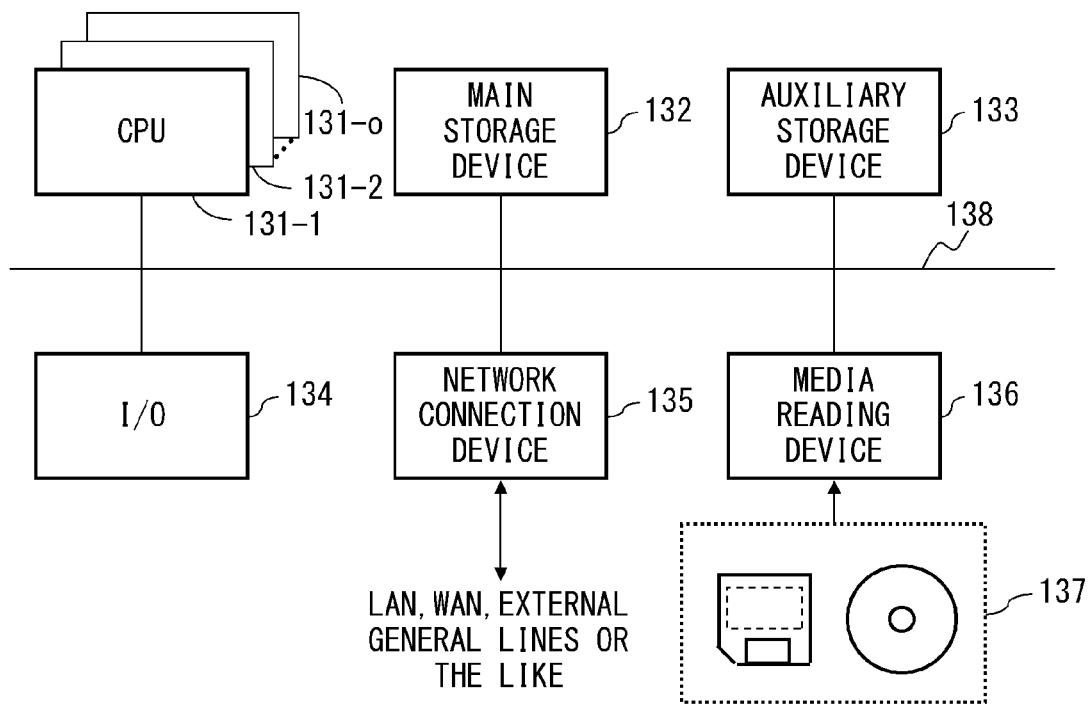
F I G. 3 0

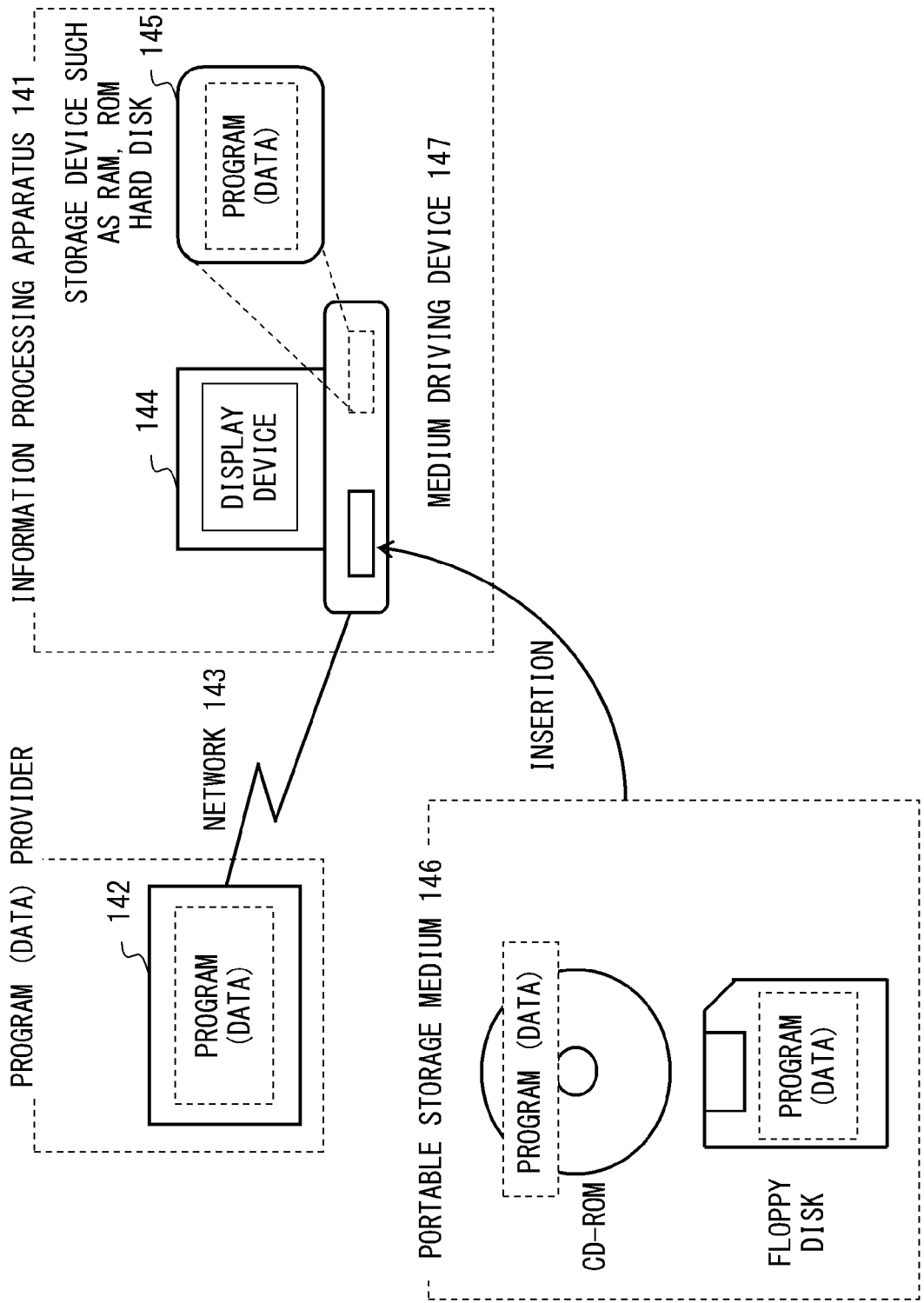
F I G. 3 1

MULTI-CPU FAILURE DETECTION/RECOVERY SYSTEM AND METHOD FOR THE SAME

CROSS-REFERENCE TO RELATED APPLICATION

This application is a continuation application of International PCT Application No. PCT/JP2007/000211, filed on Mar. 12, 2007, the entire contents of which are incorporated herein by reference.

FIELD

The embodiments discussed herein are related to multi-CPU systems, which are systems equipped with plural CPUs, and particularly to a technique of detecting a failure in a multi-CPU system in order to make the system recover from the failure automatically.

BACKGROUND

As computer systems have become faster in processing speed, improvement in the reliability of such systems has become an issue.

This means that a technique is needed that can make systems operate stably without shutting them down even when a failure has occurred.

Multi-CPU systems, which are equipped with plural CPUs, can operate stably.

The techniques described below are proposed as techniques for the detection of failures in multi-CPU systems.

Patent Document 1 discloses a technique by which operations are monitored in units of processors. In the technique of Patent Document 1, data is transmitted between processors that are connected via a communications device, and one processor monitors responses from the other processors in order to detect failures.

Patent Document 2 discloses a technique by which an abnormal operation in a system is monitored in units of instructions so that the system can recover from the failure. Patent Document 2 discloses a method in which the occurrence of a failure in a processor is monitored by the processor itself and the processor performs a resetting operation using an automatic reset occurrence circuit and a failure element holding circuit when the system can recover by resetting.

The methods disclosed by the above described patent documents have the problems described below.

In the method of Patent Document 1, processors are monitored by communications between processors themselves. This configuration causes a time gap of several minutes between the occurrence of a failure and the recognition of the failure.

In the method of Patent Document 1, information used for investigating the cause is collected after the recognition of a failure, and this means that the information collected for the investigation is not exactly from the moment at which the failure occurred. This makes it difficult to use the information for investigating the cause, and thereby the investigation tends to take a long time period or sometimes the investigation itself is prevented.

The time scale of monitoring a system (in units of minutes or seconds) and the time scale of a CPU (in units of nanoseconds) are significantly different from each other, resulting in difficulty in understanding the status of the system when a failure occurred, and thereby a long time is required to investigate the cause.

Although there is a technique of collecting information on changes in the status of a CPU in the form of log information, effective information sometimes cannot be collected using this technique because of the limitation on the volume of log information.

According to the technique of Patent Document 2, the monitoring and recovering is performed in units of instructions, and the system is reset in order to restart when the restarting of the firmware can make the system recover from a state involving failure.

In the technique of Patent Document 2, the monitoring and recovering is performed in units of instructions, making it difficult to detect a failure in a program or the like in an OS (Operating System).

Patent Document 1

Japanese Laid-open Patent Publication No. 11-328131

Patent Document 2

Japanese Laid-open Patent Publication No. 02-114364

SUMMARY

The present invention is based on the application to a multi-CPU system having plural CPUs, and includes a failure state detection unit and a recovery unit.

The failure detection unit detects a failure in operating programs.

When a failure is detected by the failure state detection unit, whether or not the recovery of the data involved in the failure is possible is determined on the basis of the content of the detected failure, and the data is recovered when this is possible.

This configuration enables the detection of a program failure and automatic recovery from it.

It is to be noted that the scope of the present invention includes a method of detecting a failure in a multi-CPU system, an automatic recovery method, and a program executed by a multi-CPU system.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed

BRIEF DESCRIPTION OF DRAWINGS

FIG. 4 illustrates the relationship between a data collection process and a failure detection criterion data generation process in a configuration of monitoring the interruption prohibition state;

FIG. 5 illustrates the relationship between the data collection process and the failure detection criterion data generation process when the exclusive control among the CPUs is monitored;

FIG. 6 schematically illustrates a failure state detection process in a case of monitoring the interruption prohibition state;

FIG. 7 schematically illustrates the failure state detection process in a case when a failure has occurred, for example with the cancellation of the CPU-exclusive control being neglected;

FIG. 16A illustrates an example of a configuration of a storage area for storing collected data illustrated in FIGS. 14 and 15;

FIG. 18 illustrates an example of a control table used in the failure detection criterion data generation process;

FIG. 19 is a flowchart for the failure state detection process performed by the data collection/failure state detection unit in process 1 performed by an emulator unit;

FIG. 24 illustrates a storage area for data collected by the event obtaining the exclusive control in the flowchart illustrated in FIG. 23;

FIG. 26 illustrates the checking of whether or not automatic recovery of the process-target control table is impossible;

FIG. 27 illustrates the checking of whether or not recovery of the process-target control table is necessary;

FIG. 28 illustrates the recovery process for the process-target control table;

FIG. 29A illustrates identification pointers in the recovery process program;

FIG. 29B illustrates an example of a configuration of identification pointers in the recovery process program;

FIG. 30 illustrates an example of a system configuration of an information processing apparatus based on a multi-CPU system according to the present embodiment; and FIG. 31 illustrates an example of a storage medium.

DESCRIPTION OF EMBODIMENTS

Figure 1:
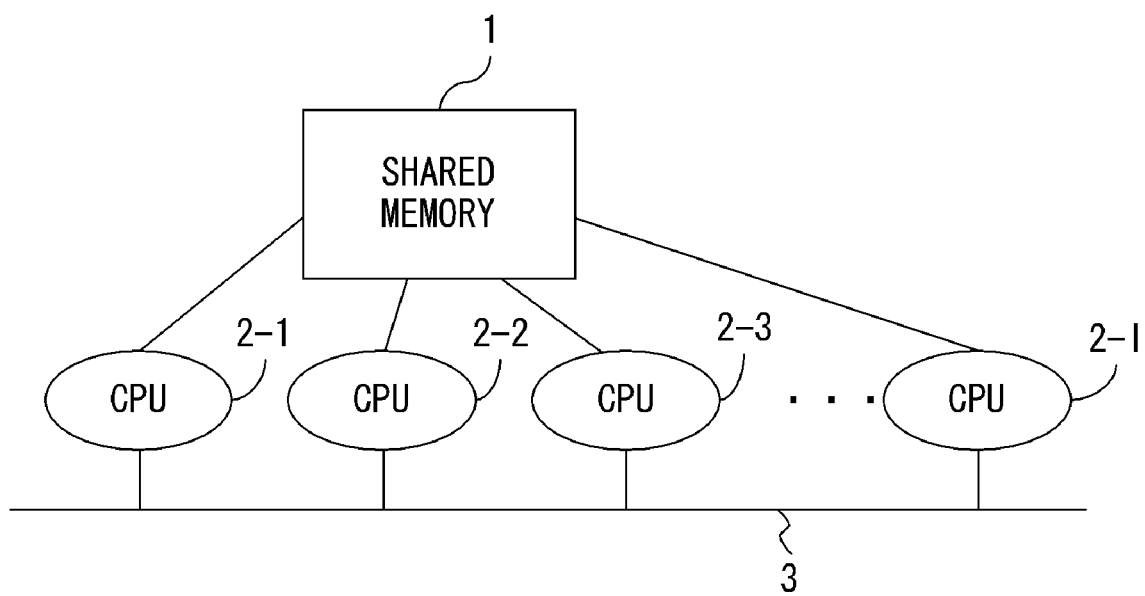
FIG. 1 illustrates a schematic configuration of an information processing apparatus adopting a configuration of a multi-CPU system on which the present invention is based.

Hereinafter, an embodiment of the present invention will be explained by referring to the drawings.

FIG. 1 illustrates a schematic configuration of an information processing apparatus adopting a configuration of a multi-CPU system on which the present invention is based.

As illustrated in FIG. 1, the information processing apparatus has a plurality of CPUs 2-1 through 2-I sharing shared memory 1. The CPUs 2-1 through 2-I can communicate with each other via a communication path 3.

Figure 2:
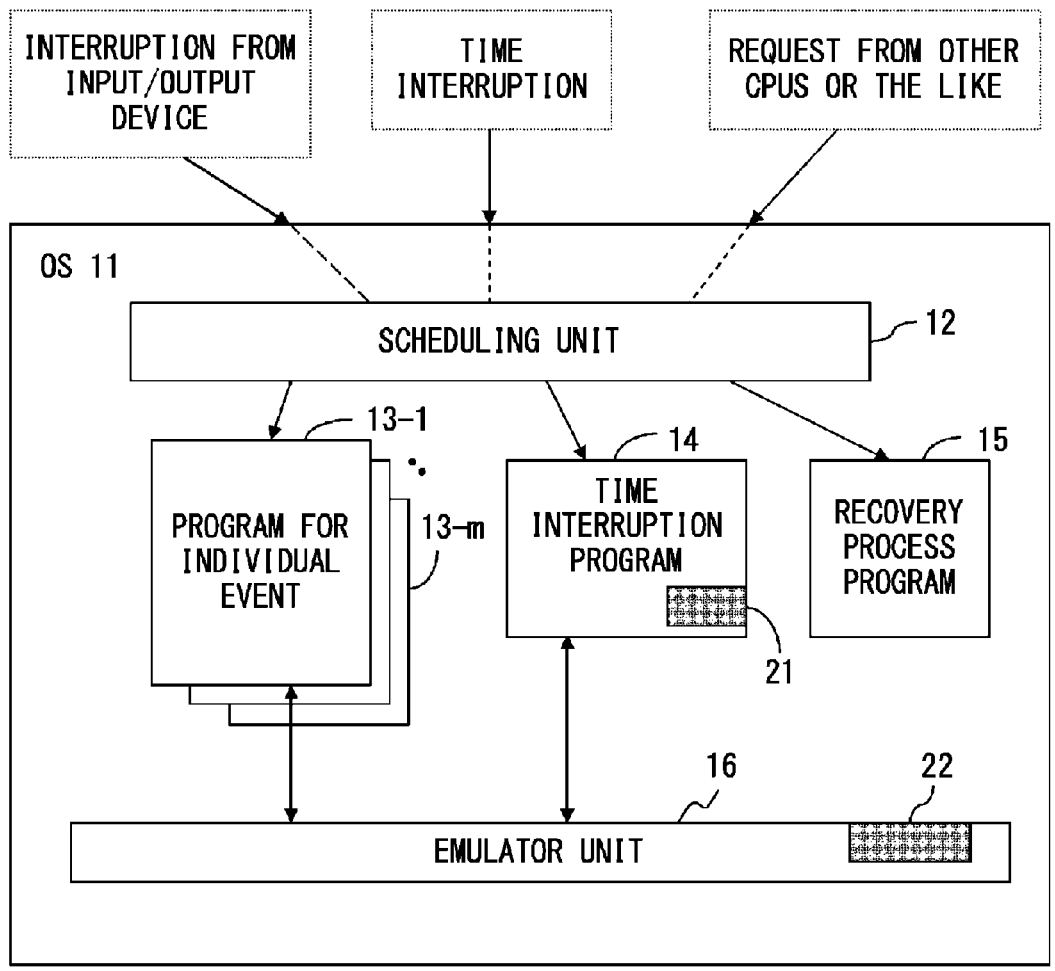
FIG. 2 illustrates an example of a configuration of an OS used in the multi-CPU system.

FIG. 2 illustrates an example of a configuration of an OS used in the multi-CPU system illustrated in FIG. 1. FIG. 2 does not illustrate all elements in the OS, but illustrates only parts having functions relating to the present embodiment.

In FIG. 2, an OS 11 includes a scheduling unit 2, a time interruption program 14, a recovery process program 15, and an emulator unit 16.

A scheduling unit 12 receives requests or the like from other CPUs, interruption requests from input/output devices, and time interruptions, etc. from other devices, and assigns, to programs 13-1 through 13-m prepared for individual events on the OS 11 or to the time interruption program 14, events that have occurred. The time interruption program 14 is started by time interruption that occurs at regular intervals. The recovery process program 15 controls the automatic recovery of the CPU in which a failure has occurred. The emulator unit 16 emulates the functions of other information processing apparatuses. It is to be noted that FIG. 2 illustrates a configuration having the emulator unit 16 for simplicity; however, the emulator unit 16 is not an essential element in the OS in the present embodiment, and thus the OS according to the present embodiment does not have to be equipped with the emulator unit 16.

The OS in the present embodiment includes the recovery process program 15 in order to realize the detection of a failure in a program and automatic recovery, and also includes a failure state detection unit 21 for detecting a failure state and a data collection/failure state detection unit 22 in the time interruption program 14 and the emulator unit 16, respectively.

The data collection/failure state detection unit 22 has an operation data collection function of collecting operation data of programs in a normal operation state, a criterion data generation function of detecting a program failure, and a function of detecting a failure in a program.

When the criterion value for determining a program failure is set to be too high, the detection accuracy is lowered, and when the value is set to be too low, the probability of erroneous detection increases so as to make it difficult for humans to set the value.

In the OS according to the present embodiment, the data collection/failure state detection unit 22 in the emulator unit 16 is equipped with a program operation data collection function and a criterion data generation function for detecting a program failure, and thereby the system can automatically generate the most appropriate criterion value without making a human set the value.

Also, when detecting a program failure, the OS in the present embodiment interrupts the CPUs other than the CPU in which the failure has been detected, and requests the CPUs to perform a recovery process. This configuration in which the CPUs other than the CPU involved in a failure perform a recovery process eliminates the necessity of adding a function for making the CPU involved in a failure perform a recovery process. Thereby, the necessity of changing the existing program logic in the OS is eliminated.

The OS according to the present embodiment includes the recovery process program 15, and thereby is equipped with a function of automatically recovering from detected failures. The recovery function includes a failure content determination process and an automatic recovery process. The automatic recovery process can include a recovery program (recovery data) that corresponds to the location and content of the failure. Provision of this recovery process program 15 enables a recovery process that is the most appropriate to the location and content of the failure.

Next, operations of the OS according to the present embodiment will be explained.

Figure 3:
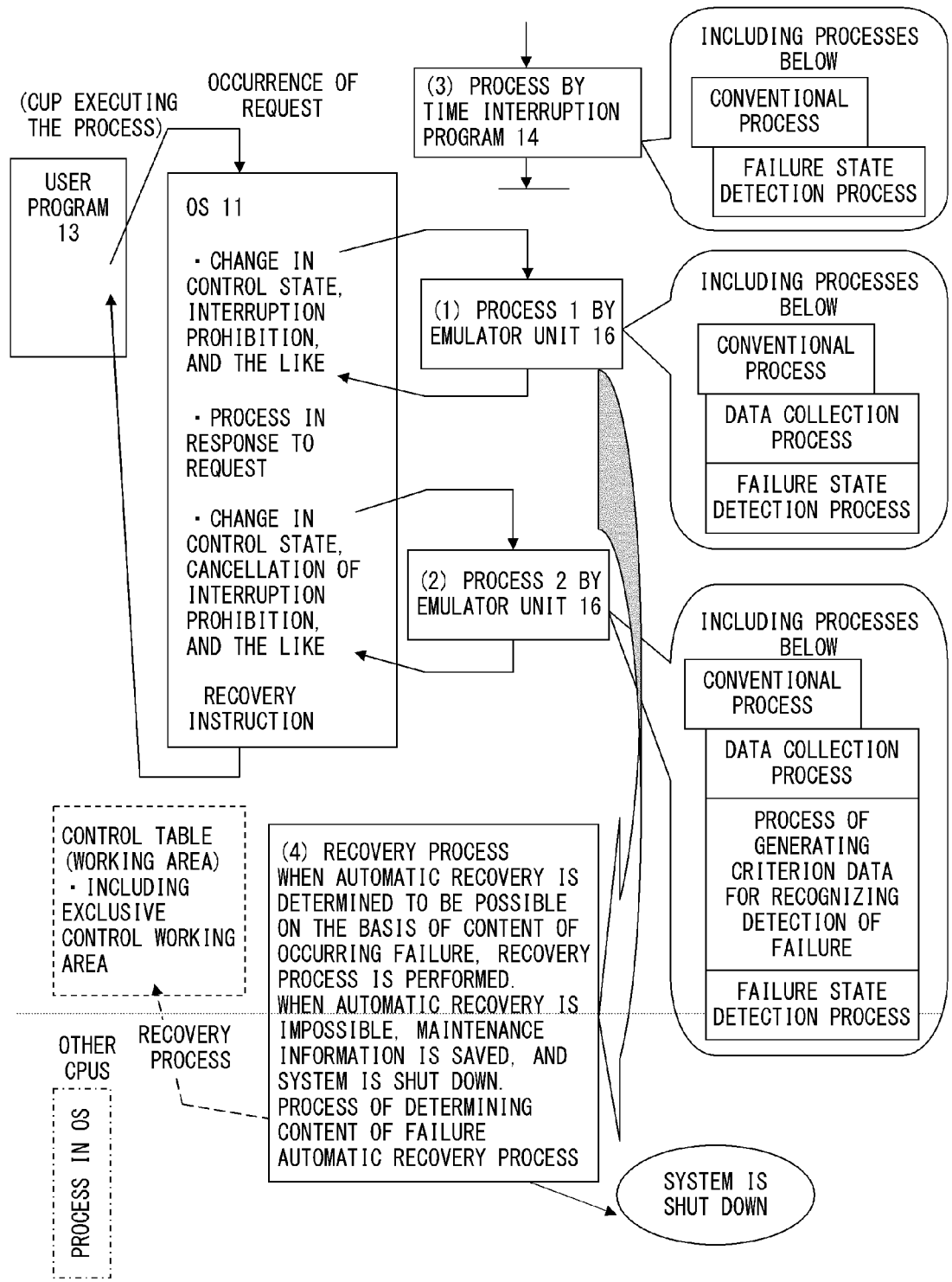
FIG. 3 schematically illustrates the operations of an OS according to the present embodiment.

FIG. 3 schematically illustrates the operations of the OS according to the present embodiment.

When a user program 13 is executed on the OS 11, the OS 11 executes: (1) process 1 of the emulator unit 16; (2) process 2 of the emulator unit 16; and (3) the process of the time interruption program 14 in the order of (1), (2), (3), (1) . . . .

(1) Process 1 of the Emulator Unit 16

Interruption is prohibited, and exclusive control among the CPUs is obtained in order to obtain resources. Also, the data collection/failure state detection unit 22 performs a process of collecting data needed for the control and a process of detecting a failure.

(2) Process 2 of the Emulator Unit 16

The prohibition of interruption is cancelled, and the executive control among the CPUs is also halted in order to release resources. Also, the data collection/failure state detection unit 22 performs a process of generating criterion data for recognizing the detection of a failure and a process of detecting a failure.

(3) Process of the Time Interruption Program 14

A process is performed for a situation where time interruption has occurred due to the updating of time, the reporting of the elapsed time to programs, and the like. Also, the failure state detection unit 21 performs a failure detection process.

When the failure detection process including processes (1) through (3) above cannot obtain exclusive control in a particular period of time or when the prohibition of interruption cannot be cancelled, a failure is determined to have occurred, and (4) a recovery process corresponding to the content of the detected failure is requested.

(4) Recovery Process

The recovery process is performed by the recovery process program 15, and includes a process of determining failure content and an automatic recovery process.

The process of determining a failure content determines whether or not automatic recovery from a failure is possible on the basis of the location and content of the failure. The automatic recovery process collects log information of the location at which the failure was detected, and performs a recovery process when an automatic recovery is determined to be possible. When an automatic recovery is determined to be impossible, the automatic recovery process saves information necessary for the investigation of the cause, and shuts down the system.

In addition, the type of the detected failure determines the CPU that is used for performing the recovery process.

Next, the data collection process and the failure detection criterion data generation process illustrated in FIG. 3 are explained.

FIG. 4 illustrates the relationship between the data collection process and the failure detection criterion data generation process in a configuration for monitoring the interruption prohibition state.

In FIG. 4, in response to an interruption prohibited request made by the user program 13 to the OS 11, the process relating to the request is performed, the interruption prohibition is cancelled, and the control is returned to the user program 13 in the OS 11.

In the OS 11 then, the process of collecting data when the interruption is prohibited (1) is performed by the emulator unit 16 in process 1 by the emulator 16; and the process of collecting the data to be used when the interruption prohibition is cancelled is performed by the emulator unit 16 in process 2 when the interruption prohibition is cancelled (2); and the failure detection criterion data generation process is performed in process 2 by the emulator unit 16 (3).

In the process of collecting data to be used when the interruption is prohibited (1), the collected log information is stored in collection area A provided for each CPU, and in the process of collecting data to be used when the interruption prohibition is cancelled (2), the collected log information is stored in collection area B provided for each CPU.

In the failure detection criterion data generation process (3), the data collected in the process of collecting data to be used when the interruption is prohibited (1) and the process of collecting data to be used when the interruption prohibition is cancelled (log information stored in collection areas A and B) is used for calculating the actual value of the time period during which the interruption was prohibited. In this process, the maximum value of the interruption prohibition time obtained when the system was operating normally is measured, and this maximum value is used as the failure detection criterion data.

FIG. 5 illustrates the relationship between the data collection process and the failure detection criterion data generation process when the exclusive control among the CPUs is monitored.

In FIG. 5, in response to a request made by the user program 13 to the OS 11, interruption is prohibited, a CPU exclusive control obtaining instruction is issued, a CPU exclusive control releasing instruction is issued, the interruption prohibition is cancelled, and the control is returned to the user program 13 in the OS 11.

In doing this, a process of collecting data when the CPU exclusive control obtainment instruction is performed (1) is performed in process 1 by the emulator unit 16 when the CPU exclusive control obtaining instruction was issued after the interruption prohibition had started, a process of collecting data when the CPU exclusive control cancellation instruction has been given (2) is performed in process 2 by the emulator unit 16 when the interruption prohibition is cancelled, and the failure detection criterion data generation process (3) is performed in process 2 by the emulator unit 16.

In the process of collecting data when the CPU exclusive control obtainment instruction is executed (1), the collected log information is stored in collection area C provided for each CPU, and in the process of collecting data when the CPU exclusive control cancellation instruction is executed (2), the collected log information is stored in collection area D provided for each CPU.

In the failure detection criterion data generation process (3), the data collected in the process of collecting data when the CPU exclusive control obtainment instruction is executed (1) and when the CPU exclusive control cancellation instruction is executed (2) (the log information stored in storage areas C and D) is used for calculating the actual value of the time period during which the interruption was prohibited. In this process, the maximum value of the interruption prohibition time obtained when the system was operating normally is measured, and this maximum value is used as the failure detection criterion data.

Next, the types of data collected in the data collection process will be explained.

In the data collection process, the following data is collected in order to "generate criterion data for recognizing the occurrence of a failure" and to "collect information for investigation".

period of time period during which user program was being executed, and CPU number of executing CPU executed instruction code, instruction address, and result of execution content of memory referred to by executed instruction value in respective registers others (information for identifying programs being executed)

The failure detection criterion data generation process (3) calculates the time period between "obtainment of resources" and "release of resources" for each of the resources in order to extract "criterion data for recognizing the failure occurrence". This maximum value is used as the criterion data for failure detection.

The reason for using the maximum value as the criterion value for the failure detection is that because the time periods taken by the respective processes vary depending upon the loads on the system, the use of values other than the maximum value would increase the likelihood of erroneous discrimination between a failure and normal operation.

In addition, criterion data is not very reliable when there is only a small number of pieces of sample data used for obtaining the criterion data, such as in a state immediately after the IPL, and thus the failure state detection process is not executed until the number of pieces of sample data exceeds a predetermined number.

Next, the failure state detection process illustrated in FIG. 3 will be explained.

FIGS. 6 and 7 illustrate the outline of the failure state detection process.

FIG. 6 illustrates a case of monitoring the interruption prohibition state.

FIG. 6 illustrates the outline of a situation in which a loop started in the interruption prohibition state due to a failure in the OS 11 or in which a failure occurred in a situation such as when the interruption prohibition was not cancelled.

When a loop has started in the interruption prohibition state due to a failure in the OS 11, when the interruption prohibition was not cancelled, or when a time-out interruption was made by a software application, the failure state detection unit 21 in the time interruption program 14 compares the "time that has elapsed since the interruption prohibition started" and the "criterion value for failure detection", detects the occurrence of a failure, and makes a request for the recovery process when a failure is detected. Also, when the occurrence of time-out interruptions by the hardware has stopped, the system is shut down in a conventional manner.

Also, when the "criterion value for failure detection" is not effective, e.g., when there is not a sufficient number of pieces of sample data, the checking process is not performed.

Next, explanations will be given for the failure state detection process performed when the exclusive control state between the CPUs is monitored.

FIG. 7 schematically illustrates a case when a failure occurred, for example, in a case when the cancellation of the CPU-exclusive control has been neglected.

When the cancellation of the CPU-exclusive control is neglected due to a mistake in the OS program, a state where the CPU-exclusive control cannot be obtained continues indefinitely.

When the CPU-exclusive control cannot be obtained, process 1 performed by the emulator 16 detects the occurrence of a failure by combining methods (a) and (b) below.

(a) Comparison between the "time that has elapsed since the CPU-exclusive control was obtained" and the "criterion value for failure detection"

(b) Comparison between the "time that has elapsed since the obtainment of the CPU-exclusive control failed first" and the "criterion value for failure detection"

The criterion value for failure detection consists of the following values.

Criterion value=maximum value×safety coefficient

In the above numerical expression, the maximum value is extracted in the failure detection criterion data generation process, and the safety coefficient is used in response to the likelihood of erroneous determination of normality and abnormality that would be caused if a normal value alone is used. The appropriate values of a safety coefficient range between 2 and 4.

When method (a) alone is used for failure detection, the detection fails when the memory area for the CPU-exclusive control is broken by some factor so that the CPU-exclusive control cannot be obtained. The use of method (b) alone for failure detection results in lower detection accuracy than the use of method (a) alone. Thus, methods (a) and (b) are used in combination.

When the elapsed time exceeds the "criterion value for failure detection" in the failure detection using methods (a) and (b) above, the data collection/failure state detection unit 22 in the emulator unit 16 determines that a failure occurred in the system, and describes the failure location and the failure content in interruption information in order to cause an interruption in another CPU. Also, when the CPU involved in the failure can recover by itself, that CPU makes a recover request to the recovery process program 15 of the CPU itself. In addition, when the "criterion value for failure detection" is not effective, the checking process is not performed.

The CPU to be interrupted is determined in the manner described below so that a particular CPU is not subject to an intensive increase in load from the CPU that makes the request for the recovery process.

CPU number of interrupted CPU=CPU number of requesting CPU+1

When the CPU number of the requesting CPU is the last number, that CPU number is treated as zero so that the interrupted CPU is determined cyclically.

Next, the recovery process will be explained.

Figure 8:
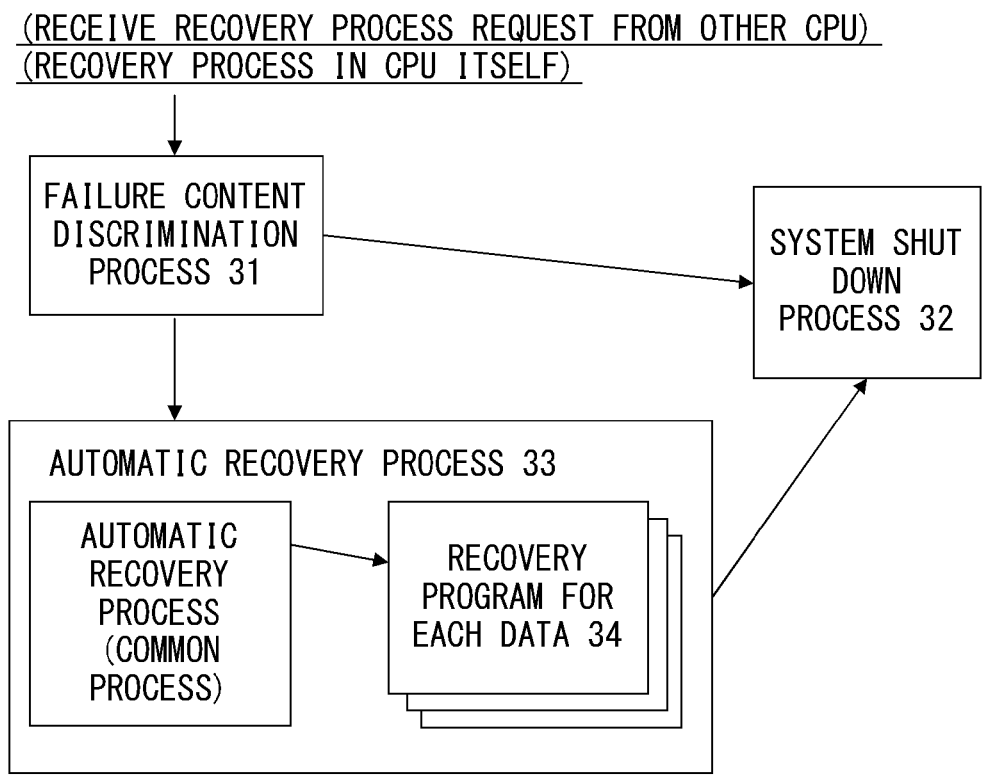
FIG. 8 illustrates the content of the process performed by a recovery process program.

FIG. 8 illustrates the content of the process performed by the recovery process program 15.

The process performed by the recovery process program 15 includes a failure content discrimination process 31, a system shutdown process 32, and an automatic recovery process 33.

Hereinafter, the respective processes will be explained in detail.

When there is an interruption from another CPU, the failure content discrimination process 31 checks, in accordance with the reported interruption information, whether or not automatic recovery is impossible, and when it is impossible, the control is given to the system shutdown process 32. When automatic recovery is possible, the control is given to the automatic recovery process 33.

The system shutdown process 32 saves the reported interruption information and the information collected in the data collection process, and thereafter performs a system shutdown process in a conventional manner.

The interruption information and the information collected in the data collection process that were saved then constitute information effective in the investigation of a cause.

The automatic recovery process 33 recovers the content of the related control table on the basis of the interruption information reported from another CPU.

When the period for monitoring the interruption prohibition state has expired, the state of the CPU that caused the interruption is confirmed, and if no program besides the OS program is executing any operations, the interruption prohibition is cancelled so as to continue the system operation, and if the OS program is operating, the system is shut down.

When the period for monitoring the CPU-exclusive control state has expired, the data (of a control table type) to be restored is determined from the interruption information reported by another CPU and the information collected in the data collection process, and the data is recovered.

When data needs to be recovered by the logic of a program, for example in a case of recovery of links between control tables, a recovery program 34 corresponding to each piece of data is used for performing automatic recovery.

Next, the failure content discrimination process 31 will be explained in detail.

When whether or not an automatic recovery is possible is to be determined on the basis of reported interruption information, interruption information reported from another CPU is used for determining the control table.

Specifically, the target control table is determined on the basis of the information collected in the data collection process, such as the instruction address, the result of executing the instruction, the content of the memory referred to during the execution of the instruction, and the values in the respective registers (position address of the control table).

Then, that control table is used for determining the content of the failure.

Figure 9:
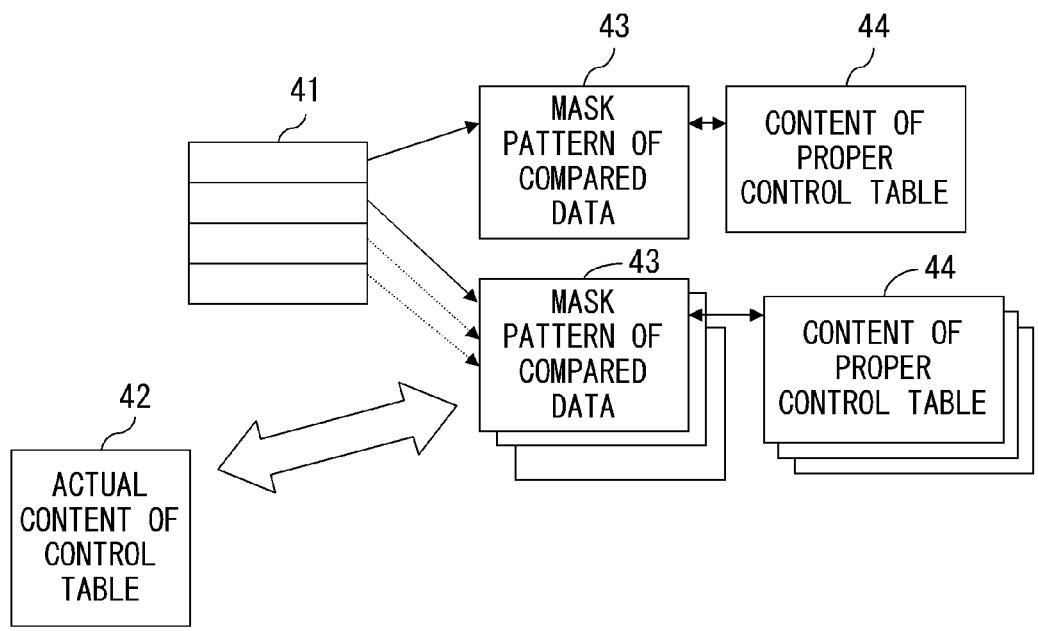
FIG. 9 illustrates a method of determining the content of a failure that has occurred.

FIG. 9 illustrates a method of determining the content of a failure that has occurred.

The failure content discrimination process 31 determines the control table that is the recovery target on the basis of collected information 41 and the type of the detected failure.

Then, an AND operation is performed on actual content 42 of the recovery target control table and a mask pattern 43 of the compared data in order to compare the result and the content of a proper control table 44 in order to check the content of a failure at an arbitrary location on the basis of whether or not they correspond.

The check of whether or not an automatic recovery is possible on the basis of the content of the target control table can be performed using the ways described below.

(1) A Method in which the Mask Pattern 43 of the Compared Data is Prepared for the Cases when Automatic Recovery is Both Possible and Impossible In this method, the mask pattern 43 for the case when automatic recovery is possible and the mask pattern for the case when automatic recovery is impossible are compared in order to check whether or not automatic recovery is possible.

(2) A Method in which Determination is Made on the Basis of the Content of a Failure In this method, when the location of the failure is a specified location, the recovery of the control table is determined to be possible.

When the failure location is only a particular location such as an exclusive control working area or an area including data used for recovery, the recovery is determined to be possible.

When the failure location is only in a constant number region, the recovery is determined to be possible or whether or not the recovery is possible is determined on the basis of the number of locations.

Next, a detailed explanation will be given to the system shutdown process 32.

The system shutdown process 32 according to the present embodiment, similar to a conventional process, collects memory dump information, saves database information, saves system halt information, and performs other processes.

Next, a detailed explanation will be given to the automatic recovery process 33.

Methods of recovering a target control table include the methods described below.

The content of the control table referred to by a program includes a constant number part and a variable number part, and they can be restored by using the methods below.

The value of a general constant number can be restored by the automatic recovery process 33 holding the recovery data for each type of the control table.

The value of a variable number that is used as an address value can often be restored by using the recovery program so that data in other control tables can be used.

The value of a variable number is restored taking the consistency with other control tables into consideration by using the recovery program in the automatic recovery process 33. Also, the value of a variable number can sometimes be restored by revising the content of the control table into the initial state, and accordingly an appropriate recovery process should be performed in accordance with the situation.

Figure 10:
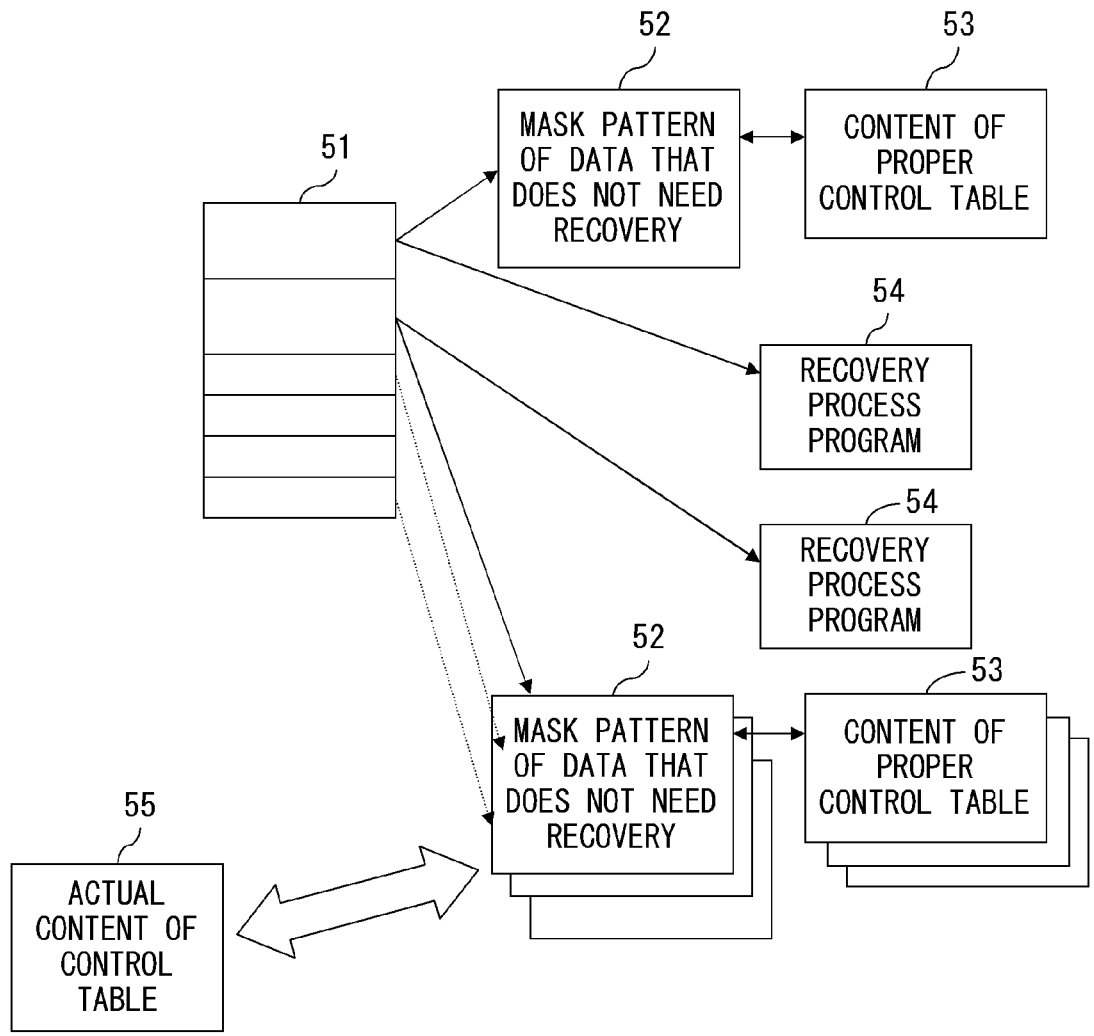
FIG. 10 illustrates a recovery method based on the content of a failure that has occurred.

FIG. 10 illustrates the recovery method based on the content of a failure that has occurred.

The automatic recovery process 33 determines a recovery pattern on the basis of the location of a failure detected in the failure content discrimination process 31.

The constant number part on a control table can be restored by performing an OR operation between content 53 of a proper control table and the result of an AND operation between content 55 of the actual control table and a mask pattern 52 of data that does not need recovery.

The constant number part and the variable number part of address information in a control table can be restored by preparing and utilizing the recovery process program 54 and recovery data for each control table.

Pieces of information that can only be limited in number such as addresses of main control tables can be restored by preparing information for a normal operation and a recovery operation. Information for recovery is stored at a position on memory at which the information will not be damaged easily by mistakes in a program.

Next, an example of the content of a control table that is linked to other control tables will be illustrated. This process is performed on the basis of the recovery program.

When a failure has occurred due to the neglecting of cancelling the CPU-exclusive control or when the content of a control table being controlled by the exclusive control involves a failure, the CPU-exclusive control is cancelled after the control table is recovered.

When the content of the control table does not involve a failure, the CPU-exclusive control is cancelled.

Figure 11:
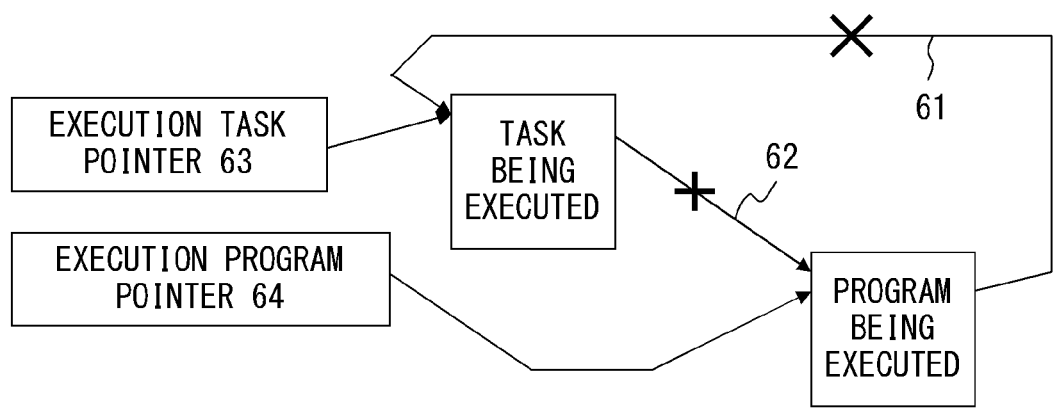
FIG. 11 illustrates an example of a method of recovering a control table.

FIG. 11 illustrates an example of a method of recovering a control table.

FIG. 11 illustrates a case when a link between different control tables is broken during the execution of a program.

When a link 61, with an "x" mark, is determined to involve a failure, the value of a task pointer 63 indicating the control table used in the task being executed is used for recovering the link 61. When a link 62, with another "x" mark, is determined to involve a failure, the value of a task pointer 64 of a program being executed can be used for recovering the link 62.

Figure 12:
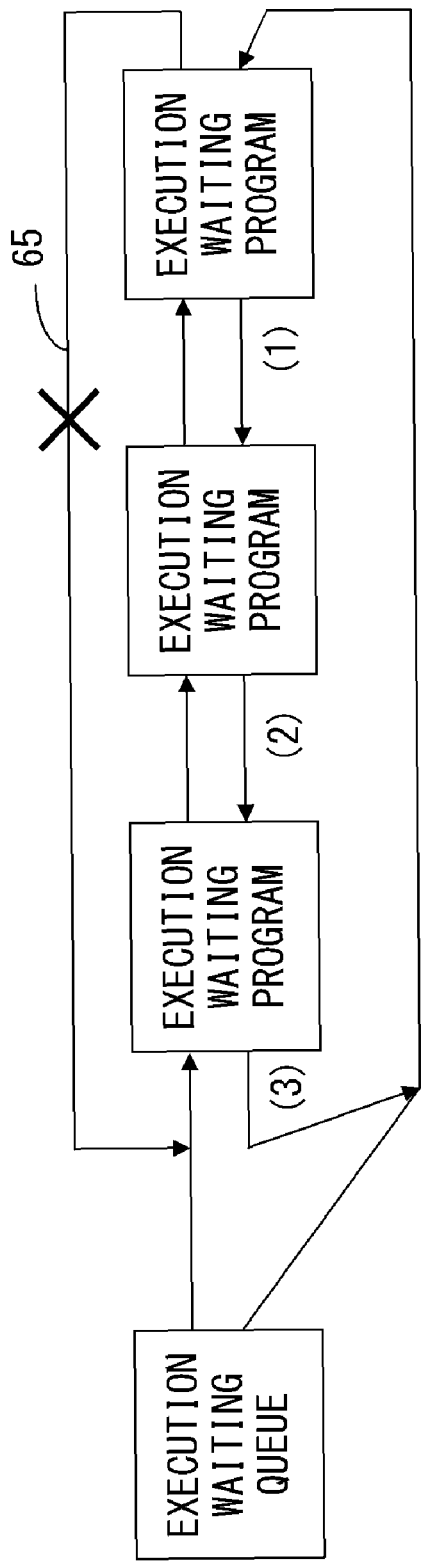
FIG. 12 illustrates an example of a method of recovering a control table when a link between identical control tables is broken while the program is waiting to be executed.

FIG. 12 illustrates an example of a method of recovering a control table when a link between identical control tables is broken while the program is waiting to be executed.

In FIG. 12, when a link 65, with an "x" mark, is determined to involve a failure, links are traced in the order of (1), (2), and (3) in order to recover the link 65.

Figure 13:
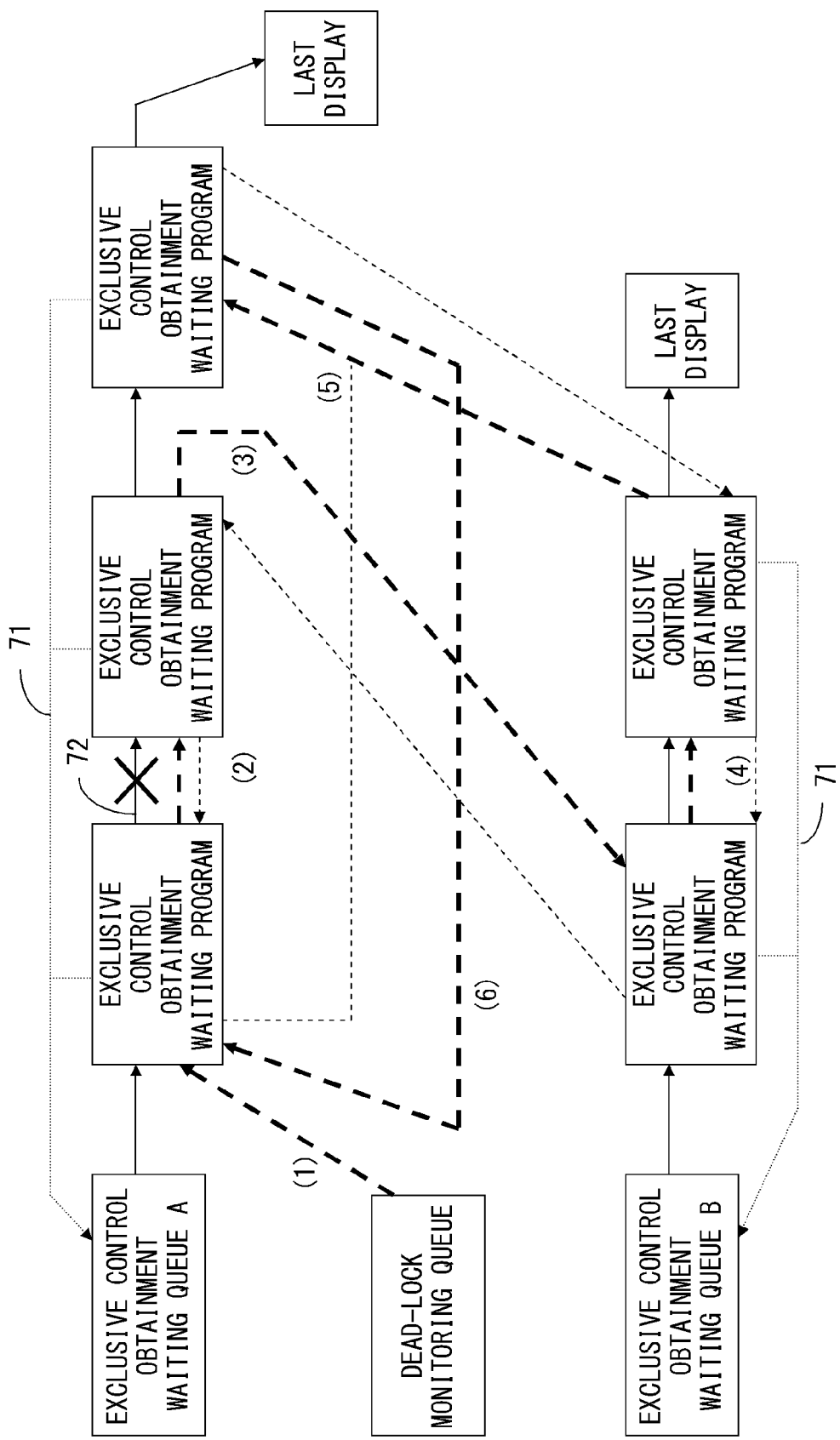
FIG. 13 illustrates an example of a recovery method used when there are plural links between identical control tables.

FIG. 13 illustrates an example of a case when there are plural links between identical control tables. This example is based on the assumption that the exclusive control has a dead-lock monitoring function and that requests that are waiting in an exclusive control obtainment waiting queue have a waiting queue address 71.

In FIG. 13, when a link 72, with an "x" mark, is determined to involve a failure, a search for the requests received from a dead-lock monitoring queue 73 is made in the order of (1), (2), (3), (4), (5), and (6) (thick dotted arrows) so that the link information of exclusive control obtainment waiting queue A can be recovered by extracting the requests in exclusive control obtainment waiting queue A.

Next, an explanation is given for the recovery of a control table performed when a failure has occurred due to the neglecting of the cancellation of the interruption prohibition.

When a failure has occurred due to the neglecting of the cancellation of the interruption prohibition or when the content of the control table used in a program that requested the interruption prohibition immediately before involves a failure, the interruption prohibition is cancelled after the information on the control table is recovered. When the content of the control table does not involve a failure, the interruption prohibition is cancelled without performing any processes.

The control table is recovered using the same method as in the above case of the neglecting of the CPU-exclusive control cancellation.

The interruption prohibition can be set and cancelled by updating the content of the control registers in the CPUs.

Figure 14:
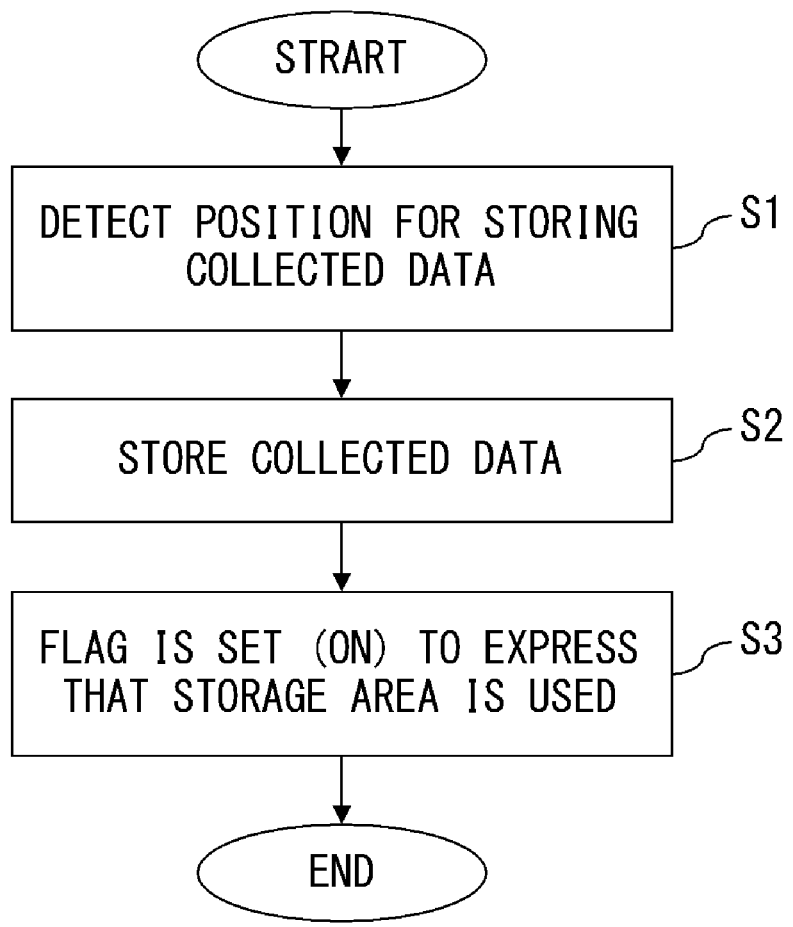
FIG. 14 illustrates a flowchart for a process performed by a data collection/failure state detection unit in process 1 performed by an emulator unit.

FIG. 14 illustrates a flowchart for the process performed by the data collection/failure state detection unit 22 in process 1 performed by the emulator unit 16. FIG. 14 focuses on the data collection process.

In FIG. 14, when the process is activated, the point of the collection data that is being currently used is used in step S1 in order to detect a next collection data storage area as a position for storing the data collected by the data collection process. In step S2, the collected data is stored in that area.

Then, in step S3, a flag for indicating whether or not the area is being used is set to ON in the storage area in order to express that the area is being used, and the process is terminated.

Figure 15:
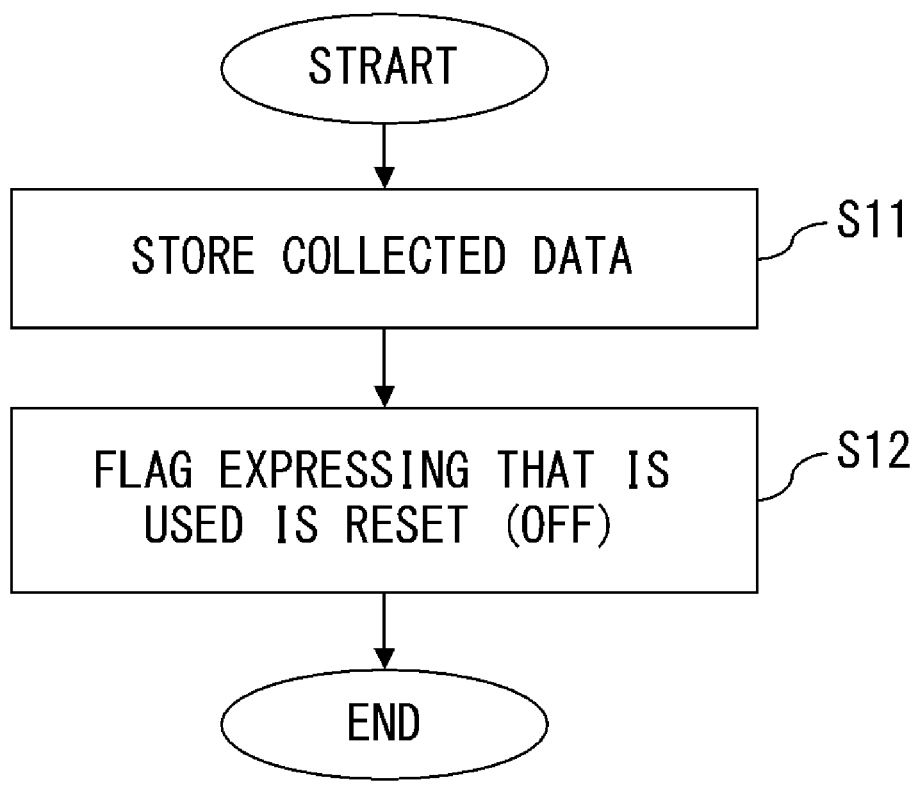
FIG. 15 illustrates a flowchart describing the content of a process performed by the data collection/failure state detection unit in process 2 performed the emulator unit.

FIG. 15 illustrates a flowchart describing the content of the process performed by the data collection/failure state detection unit 22 in process 2 performed by the emulator unit 16. FIG. 15 also focuses on the data collection process.

In FIG. 15, when the process is activated, the flag for indicating whether or not the area is being used is checked in order to confirm that there is a storage area that is currently being used (ON) in step S11 in order to store the collected data in the storing data obtained in step S1 in FIG. 14.

In step S12, the flag indicating that the area is currently being used is reset (OFF) to terminate the process.

Figure 16B:
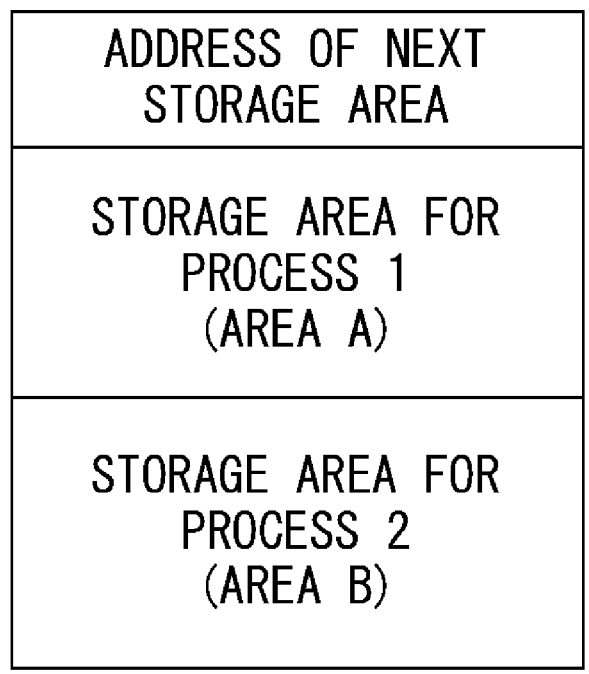
FIG. 16B illustrates a configuration of each collected data storage area.

FIGS. 16A and 16B illustrate an example of a configuration for storing collected data in processes 1 and 2 illustrated in FIGS. 14 and 15.

FIG. 16A illustrates a configuration in which a plurality of areas for storing collected data are used cyclically. The position for storing the collected data of the position that is currently being used is specified by the pointer of the area for storing the collected data that the data collection/failure state detection unit 22 has. The pointer is configured to point to the next storage area when the storing process is finished.

FIG. 16B illustrates a configuration of each collected data storage area.

Each area has a storage area for storing the address as the pointer to the next storage area, a storage area for process 1 (area A), a storage area for process B (area B), and a flag (not illustrated) for indicating whether or not the area is currently being used.

The data collected in the data collection process and stored in this storage area includes a time period during which the target program was being executed, the CPU number of the CPU that executed the program, the execution instruction code, the execution instruction address, the result of executing the instruction, content of the memory referred to during the execution of the instruction, the values in the respective registers, and information used for determining the program being executed (executed task, executed process, activation factor (such as interruption type, etc.)).

Figure 17:
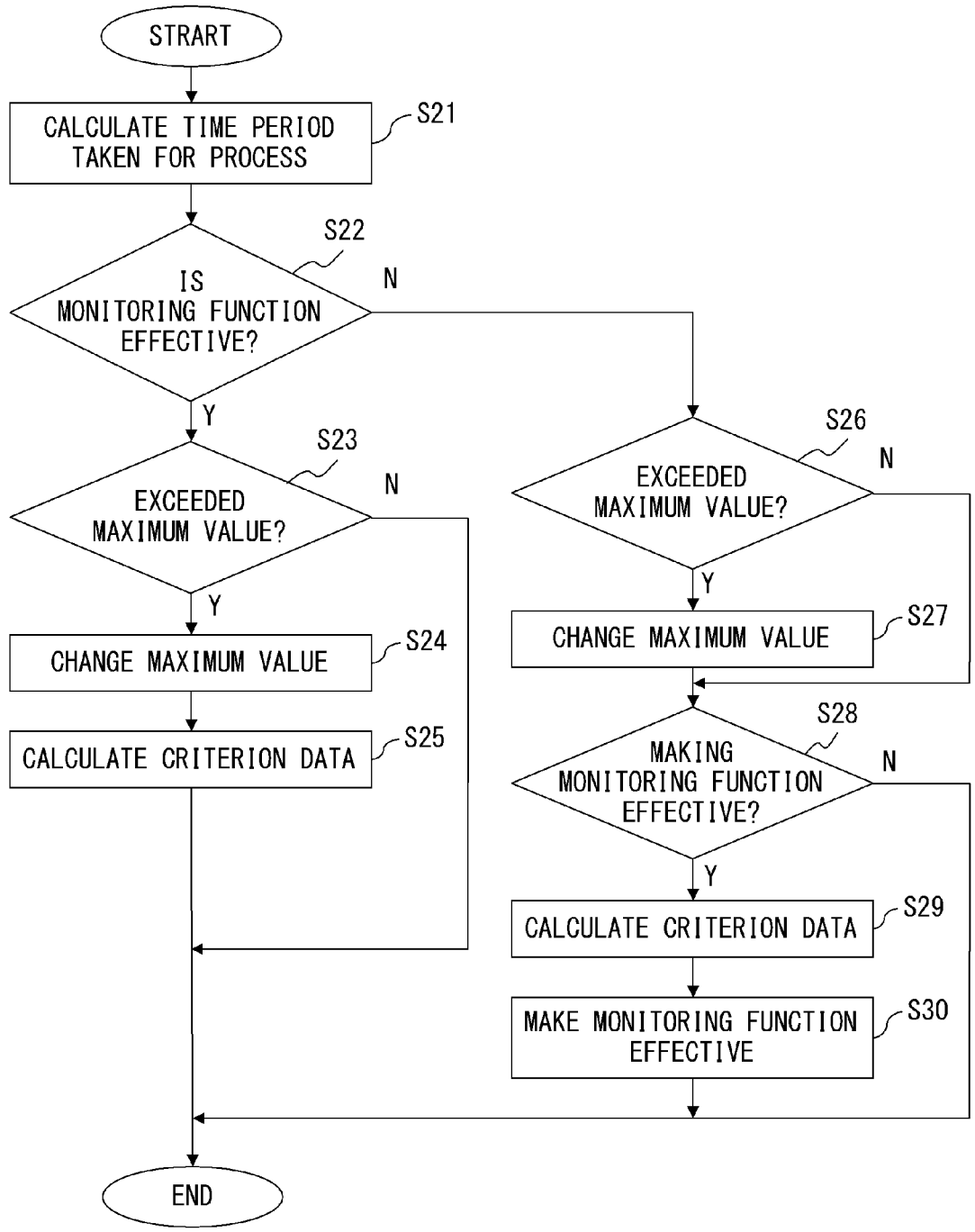
FIG. 17 illustrates a flowchart for a failure detection criterion data generation process performed by the data collection/failure state detection unit in process 2 performed by the emulator unit.

FIG. 17 illustrates a flowchart for the failure detection criterion data generation process performed by the data collection/failure state detection unit 22 in process 2 performed by the emulator unit 16.

In FIG. 17, when the process is activated, the time taken for the processing of the target program is calculated in step S21. Specifically, the time between the obtainment and cancellation of the exclusive control or the time between the start and end of the interruption prohibition is calculated.

In the present process, it is determined whether or not the monitoring function is effective in step S22, and when it is determined to be effective (Yes in step S22), it is determined in step S23 whether or not the time calculated in step S21 has exceeded the maximum value. When the time is determined to have exceeded the maximum value (Yes in step S23), the maximum value is updated in step S24 to the value calculated in step S21, and the criterion value is calculated in step S25 on the basis of the maximum value after the update, and thereafter the process is terminated. When it is determined in step S23 that the time calculated in step S21 has not exceeded the maximum value (No in step S23), step S25 is skipped so as to terminate the present process.

When the monitoring function is determined in step S22 to be ineffective (No in step S22), it is determined in step S26 whether or not the time calculated in step S21 has exceeded the maximum value, and when the time is determined to have exceeded the maximum value (Yes in step S26), the maximum value is changed to the value of that time in step S27, and when the time has not exceeded the maximum value (No in step S26), the process of changing the maximum value in step S27 is skipped.

Next, it is determined in step S28 whether or not to make the monitoring function effective, and when the function is to be made effective (Yes in step S28), the criterion data is calculated in step S29, and the monitoring function is made effective in step S30, and the process is terminated. When it is determined in step S28 that the monitoring function is not to be made effective (N in step S28), the process is then terminated.

FIG. 18 illustrates an example of a control table used in the failure detection criterion data generation process illustrated in FIG. 17.

The control table illustrated in FIG. 18 has a state display area, a detection work area when a monitoring function is activated, a maximum value area for collected data, and a criterion data area for determining a failure.

The state display area stores information on whether or not to make the monitoring function effective, and whether or not the monitoring function is effective is determined by checking the setting in this area in step S22 in FIG. 17. In step S30, the monitoring function is made effective by changing the setting of this state display area. The detection operation area when the monitoring function is activated is a work area used for determining when to activate the monitoring function. Examples of this determination include counting the number of pieces of collected data in order to activate the monitoring function when the number exceeds a specified number, and monitoring the time period that has elapsed since the IPL completion in order to activate the monitoring function when a prescribed time period has elapsed. The maximum value area for collected data stores the maximum data of collected data, and it is updated in steps S24 and S27 when the maximum value is determined to have exceeded the current maximum value in step S23 and S26. The criterion data area for determining a failure stores the pointer value indicating the position at which the criterion data calculated in steps S25 and S29 for determining a failure is stored.

FIG. 19 is a flowchart for the failure state detection process performed by the data collection/failure state detection unit 22 in process 1 performed by the emulator unit 16. FIG. 19 illustrates an example of a case when failure detection was performed in the exclusion process.

In FIG. 19, when the exclusive control is obtained (No in step S41), the process is terminated.

When the exclusive control cannot be obtained (Yes in step S41), the time period that has elapsed since the latest obtainment of the exclusive control is calculated in step S42.

When the calculated time period is determined to have exceeded the criterion value (Yes in step S43), reporting information is generated in order to report to the other CPUs that a failure state was detected, and thereafter the process is terminated. When the calculated time is determined in step S43 not to have exceeded the criterion value (No in step S43), step S44 is skipped to terminate the process in order to wait until the elapsed time exceeds the criterion value.

Figure 20:
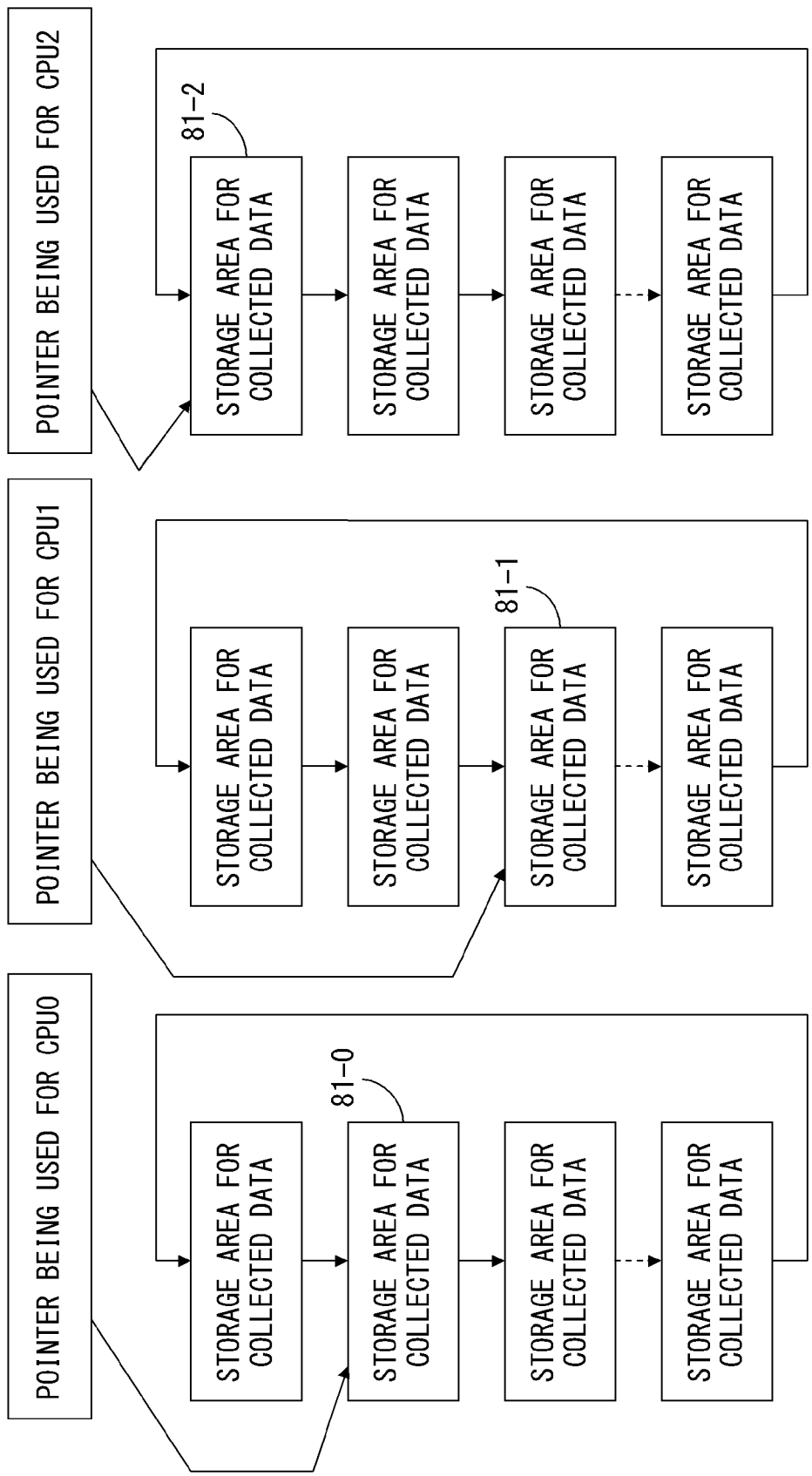
FIG. 20 illustrates the CPUs that attempted to obtain the exclusive control, relating to the process of calculating the time elapsed since the latest obtainment of the exclusive control performed in step S42 in FIG. 19.

FIG. 20 illustrates the CPUs that attempted to obtain the exclusive control, which relates to the process of calculating the time elapsed since the latest obtainment of the exclusive control performed in step S42 in FIG. 19.

The system according to the present embodiment is a multi-CPU system, and thus there are plural candidates for the CPU that obtained exclusive control most recently in the failure state detection process performed by the data collection/failure state detection unit 22 in process 1 performed by the emulator unit 16.

In, for example, a system equipped with three CPUs 0 through 2 as illustrated in FIG. 20, even when CPU 0 detects a failure state, there are three candidates for the position that stored the data when the latest obtainment of the exclusive control was performed, i.e., a storage area 81-1 for data collected by CPU 0, a storage area 81-1 for data collected by CPU 1, and a storage area 81-2 for data collected by CPU 2.

In the failure state detection process performed in process 1, the elapsed time calculation is performed in step S42 for all pieces of data.

Figure 21:
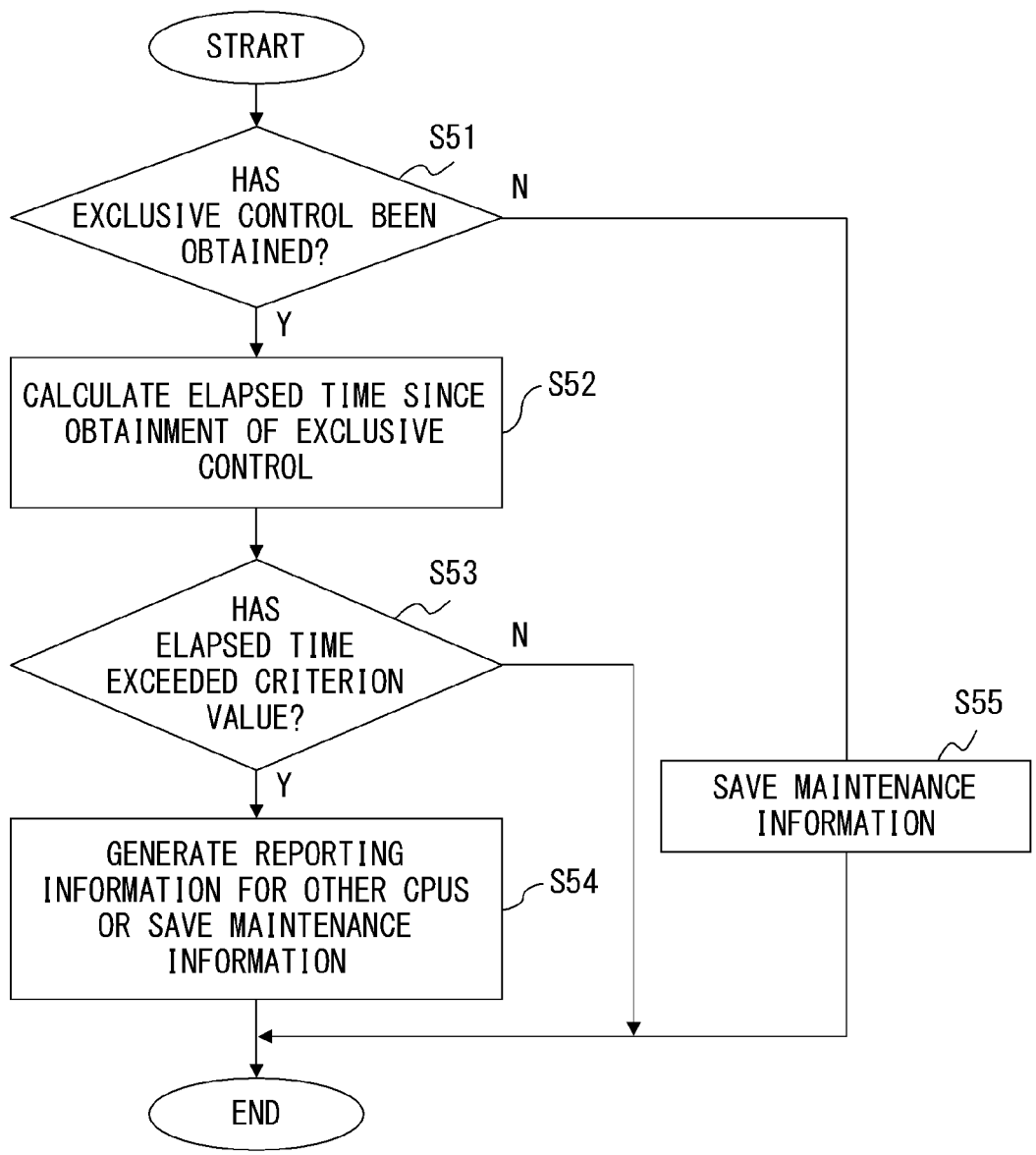
FIG. 21 illustrates a flowchart for the failure state detection process performed by the data collection/failure state detection unit in process 2 performed by the emulator unit.

FIG. 21 illustrates a flowchart for the failure state detection process performed by the data collection/failure state detection unit 22 in process 2 performed by the emulator unit 16. FIG. 21 illustrates an example of a case when failure detection is performed in the exclusion process.

In FIG. 21, it is determined in step S51 whether or not the CPU that performs this process has obtained the exclusive control, and when the CPU has not obtained it (No in step S51), maintenance information is saved to memory, and the process is terminated.

When it is determined in step S51 that the CPU has obtained the exclusive control (Yes in step S51), the time period that has elapsed since the obtainment of the exclusive control is calculated in step S52.

When the elapsed time is determined to have exceeded the criterion value (Yes in step S53), reporting information is generated to report to the other CPUs that a failure state was detected, and maintenance information is saved so as to terminate the process. When the elapsed time is determined not to have exceeded the criterion value in step S53 (No in step S53), step S54 is skipped so as to terminate the process in order to wait until the elapsed time exceeds the criterion value.

Examples of the maintenance information saved in steps S54 and S55 include information representing the failure content, an execution time period, the CPU number of the execution CPU, the execution instruction code, the execution instruction address, the result of executing the instruction, content of the memory referred to during the execution of the instruction, the values in the respective registers, information used for determining the program being executed (executed task, executed process, and an activation factor (such as interruption type, etc.)).

Figure 22:
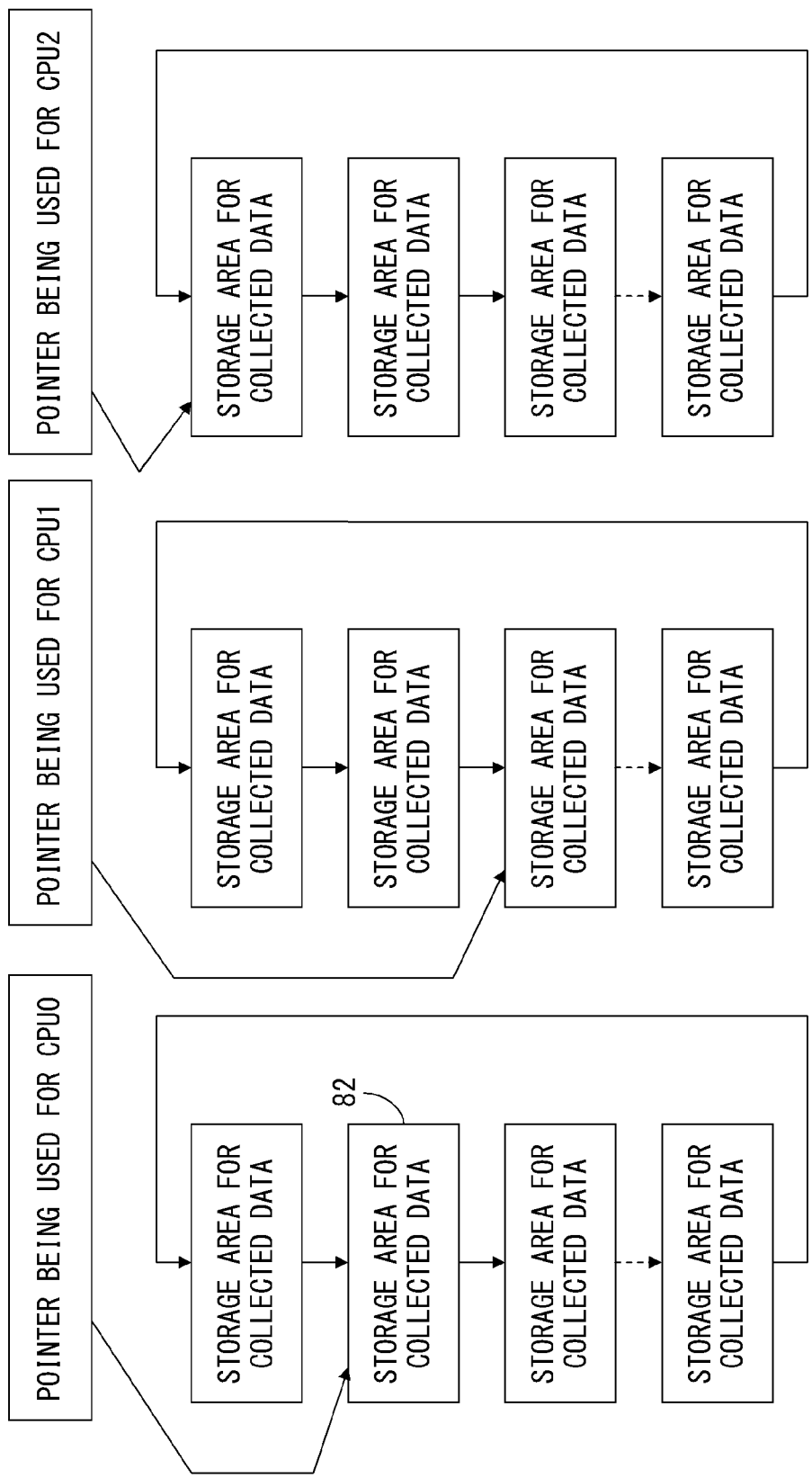
FIG. 22 illustrates the CPUs that attempted to obtain the exclusive control, relating to the process of calculating the time that elapsed since the obtainment of the exclusive control performed in step S52 in FIG. 21.

FIG. 22 illustrates the CPUs that attempted to obtain the exclusive control, relating to the process of calculating the time that elapsed since the obtainment of the exclusive control performed in step S52 in FIG. 21.

In the failure state detection process performed in process 2 performed by the data collection/failure state detection unit 22, there is only one CPU that obtained the exclusive control immediately before, and accordingly the number of pieces of data relating to the obtainment of the exclusive control performed immediately before is one.

In a system having three CPUs 0 through 2 illustrated, for example, in FIG. 2, when CPU 0 has detected a failure state, the position for storing the data when the exclusive control was most recently obtained is a storage area 82 for the data collected by CPU 0.

Figure 23:
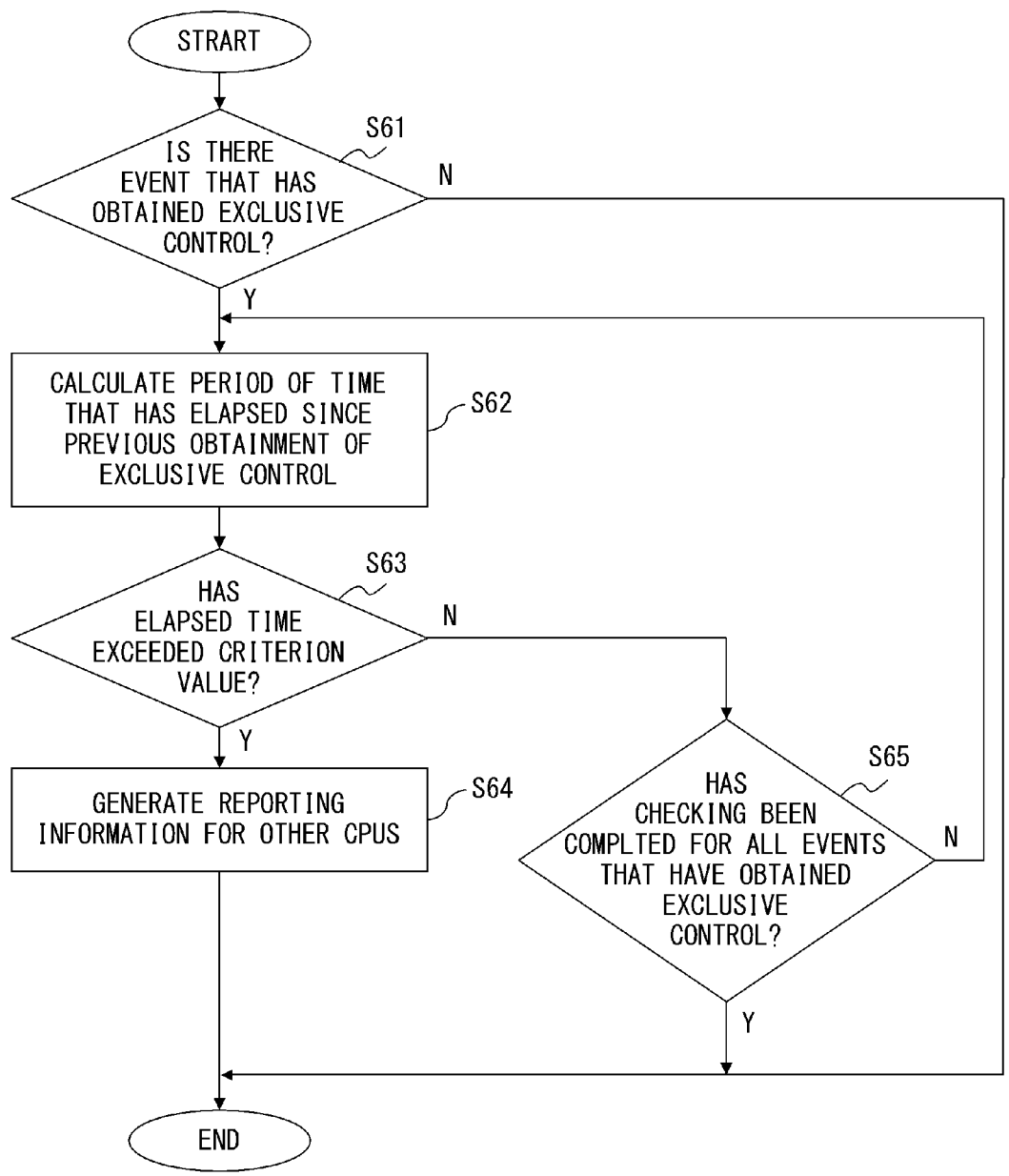
FIG. 23 illustrates a flowchart for a process performed by a time interruption program.

FIG. 23 illustrates a flowchart for the process performed by the time interruption program 14. The flowchart in FIG. 23 illustrates an example of the exclusion process.

The process performed by the time interruption program 14 checks the scope controlled by each CPU so that a particular CPU is not subject to an intensive increase in load.

In FIG. 23, when the process is activated, the CPU performing this process determines in step S61 whether or not there is an event that has obtained the exclusive control. When there is not such an event (No in step S61), the process is terminated.

When it is determined that there is an event that has obtained the exclusive control (Yes in step S61), the time period that has elapsed since the latest obtainment of the exclusive control is calculated in step S62.

When the elapsed time calculated in step S62 is determined to have exceeded the criterion value (Yes in step S63), the reporting information is generated in step S64 to report to the other CPUs that a failure state was detected, and the process is terminated.

When the elapsed time is determined in step S63 not to have exceeded the criterion value (No in step S63), it is checked in step S65 whether or not the checking of all events has been completed, and when it is determined that the checking of all events has not been completed (No in step S65), the process returns to step S62 in order to perform the processes in steps S62 and S63 on the events that have not been checked, and when it is determined that the checking of all events has been completed (Yes in step S65), the process is terminated.

FIG. 24 illustrates a storage area for the data collected by the event obtaining the exclusive control in the flowchart performed by the time interruption program 14 in FIG. 23.

In the data collection process, the storage areas for collected data are configured to be cyclic, and the storage area that is being used currently is specified by a pointer.

When the CPU executing the time interruption program 14 whose flowchart is illustrated in FIG. 23 is performing a plurality of exclusive control operations, there are a plurality of events that are the targets of the process, and there are a plurality of storage areas for storing the collected data as well.

In FIG. 24, two storage areas 83-1 and 83-2 are the storage areas for the process-target events.

Figure 25:
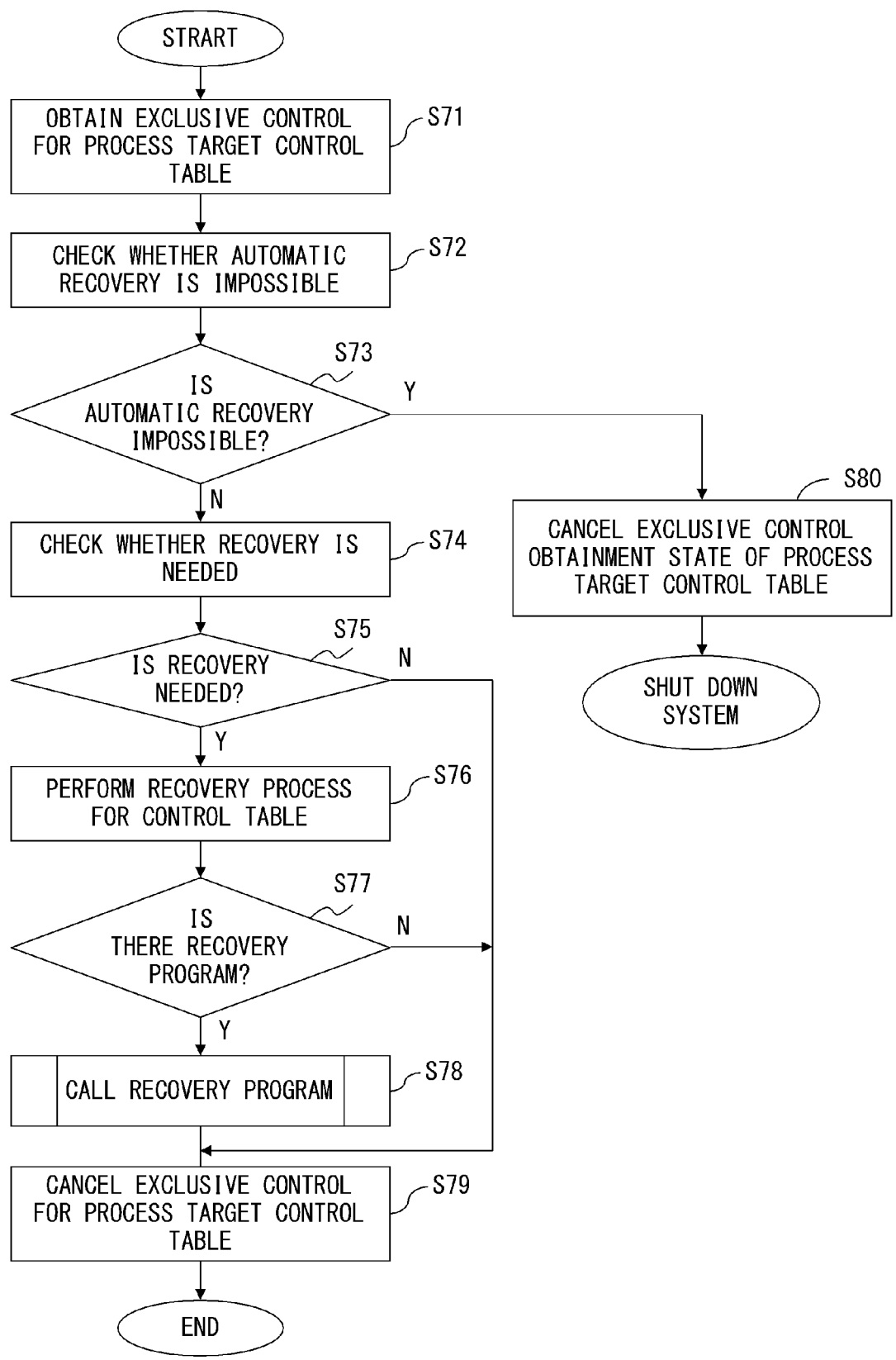
FIG. 25 illustrates a flowchart for a recovery process performed by the recovery process program.

FIG. 25 illustrates a flowchart for the recovery process performed by the recovery process program 15.

When the process in FIG. 25 is activated, the exclusive control is obtained for the process-target control table in step S71. When the process-target control table has already obtained the exclusive control, the exclusive control obtainment process is not performed.

Next, it is checked whether or not the automatic recovery of the process-target control table is impossible. The way this check is performed will be explained later.

When the automatic recovery of the process-target control table is impossible (Yes in step S73), the exclusive control obtainment state of the process-target control table is cancelled in step S80, the system is shut down, and the process is terminated.

When the automatic recovery of the process-target control table is possible (No in step S73), it is checked whether or not the recovery of the process-target control table is needed in step S74. The way this check is performed will be explained later.

When the recovery of the process-target control table is needed (Yes in step S75), the process proceeds to step S76, and when it is not needed (No in step S75), the process proceeds to step S79.

In step S76, the recovery process is performed on the control table. This process will be explained later in detail.

When the recovery process for the control table in step S76 is finished, it is checked whether or not there is a recovery program, and when there is (Yes in step S77), the corresponding recovery program is called and executed in step S78, and when there is not (No in step S77), the process proceeds to step S79.

In step S79, the exclusive control obtainment state of the process target is cancelled in step S79, and the process is terminated.

The flowcharts illustrated in FIGS. 19, 21, and 23 are examples for the detection of the exclusive control. However, the detection of cancellation failure of an interruption can be performed by using the same flowcharts as in FIGS. 19, 21, and 23, except that the scope of the calculation of the elapsed time starts from the time point at which the interruption prohibition starts.

Next, the checking, in step S72 in FIG. 25, of whether or not the automatic recovery of the process-target control table is impossible will be explained.

FIG. 26 illustrates the checking of whether or not the automatic recovery of the process-target control table is impossible.

In the checking, the result of an AND operation between content 91 of the actual control table and a mask pattern 92 of the comparison data is compared with content 93 of a proper control table. When the comparison indicates that they are identical, automatic recovery is determined to be possible, and when the comparison result indicates that they are not identical, automatic recovery is determined to be impossible.

When the AND operation between the content 91 of the actual control table and the mask pattern 92 results in all zero, the content 93 of a proper control table can be used together with content 103 of a proper control table that will be used for determining whether or not the recovery is needed, and the amount of memory needed to store this can be reduced.

In FIG. 23, the result of the AND operation between a portion 94 of the content 91 of the actual control table and a portion 95 of the mask pattern 92 corresponds to a portion 96 of the content 93 of a proper control table, and the other portions are all zero. Portions that are all zero are not compared with the content 93 of a proper control table, and thus automatic recovery is possible in the example in FIG. 26.

The checking, performed in step S74 in FIG. 25, of whether or not the recovery of the control table is needed will be explained.

FIG. 27 illustrates the checking of whether or not the recovery of the process-target control table is needed.

In this checking, it is checked whether or not a value that can recover automatically such as a constant number on the control table has been damaged.

An AND operation is performed between content 101 of the actual control table and a mask pattern 102 for extracting an area that can recover automatically, and the result of the AND operation is compared with content 103 of a proper control table in order to check the value in an arbitrary area. As has been described, the content 103 of a proper control table can be configured to be information having the same content as the content 93 of a proper control table used for the checking of whether or not the automatic recovery of the control tables illustrated in FIG. 26 is impossible.

In the example illustrated in FIG. 27, automatic recovery is not needed because the result of an AND operation between content 101 of the actual control table and a mask pattern 101 corresponds to the content of a proper control table.

Next, the process of recovering a control table performed in step S76 in FIG. 26 will be explained.

FIG. 28 illustrates the recovery process for the process-target control table.

In the recovery process for a control table, an AND operation is performed between content 111 of the actual control table and a mask pattern 112 of a portion that does not need recovery, and an OR operation is performed between the result of the AND operation and content 113 of a proper control table in order to generate recovery data.

In the mask pattern 112 of a portion that does not need recovery, bits to be recovered are set to zero, and bits not needing recovery are set to 1. Accordingly, an OR operation between the content 113 of a proper control table and the result of the AND operation of the mask pattern 112 generates recovery data.

When the content 111 of the actual control table is to be restored, the data for the exclusive control is restored after the completion of the content 111 of the actual control table. In the case of FIG. 28, a portion 114 corresponds to the data for the exclusive control, and "800" is rewritten to "0000" as the last portion.

The content 113 of a proper control table is generated when generating the target control table held by the recovery process program 15 as a fixed value, or is generated by holding a program generated by the recovery process program 15 by referring to another control table.

A method of generating again a target table in the recovery process for a control table can also be used as a recovery process for a control table.

FIG. 29A illustrates identification pointers in the recovery process program 15.

Identification pointers 121-1 through 121-n are provided for each type of detected failure, and the recovery process program 15 uses the identification pointers 121-1 through 121-n corresponding to the type of a failure reported together with a request for recovery from other CPUs so that the recovery process program 15 can obtain the data of content 122 of a proper control table, a recovery program 123, a mask pattern 124, and the like that are necessary for the above recovery process.

FIG. 29B illustrates an example of a configuration of the identification pointers 121.

In the pointer 121 illustrated in FIG. 29B, an identification code of a detected failure, information on the process-target resource, the address of a process-target resource (control table), the address of mask pattern data used for determining whether or not automatic recovery is impossible, the address of mask pattern data used for determining whether or not recovery is needed, the address of mask pattern data used for extracting a portion not needing automatic recovery, the address of recovery data (content of a proper control table), and the entry address of the recovery program are stored.

When receiving a request for recovery from another CPU, the recovery process program selects one of the identification pointers 121 on the basis of the type of the failure, and uses the selected identification pointer in order to obtain the mask patterns, programs, and the like used for the recovery process.

FIG. 30 illustrates an example of a system configuration of an information processing apparatus based on a multi-CPU system according to the present embodiment.

The information processing apparatus in FIG. 30 includes a plurality of CPUs 131-1 through 131-o, a main storage device 132 such as RAM or the like, an auxiliary storage device 133 such as a harddisk or the like, an input/output (I/O) device 134 such as a display device, a keyboard, a pointing device or the like, a network connection device 135 such as a modem or the like, a media reading device 136 for reading recorded content from a portable storage medium such as a disk, and a magnetic tape or the like, all of which are connected to each other via a bus 138. These constituent elements exchange data between each other via the bus 138.

The plurality of CPUs 131-1 through 131-o use the main storage device 132 and the auxiliary storage device 133 as shared memory, and execute the processes described in the flowcharts in FIGS. 14, 15, 17, 19, 21, and 23 by executing the program (OS) on the main storage device 132 and the auxiliary storage device 133.

In the information processing apparatus in FIG. 30, the media reading device 136 reads programs and data stored in magnetic tape, a flexible disk, CD-ROM, an MO disk or the like in order to load them onto the main storage device 132 or the auxiliary storage device 133. These programs and data are executed and used by the plurality of CPUs 131-1 through 131-o so that the above processes of the flowcharts are implemented by means of software.

In the information processing apparatus illustrated in FIG. 30, software applications are sometimes exchanged by using a storage medium 77 such as a flexible disk or the like. Accordingly, the present invention can be configured as a multi-CPU system, a method of detecting a failure, and an automatic recovery method, and also can be configured, when used by a computer, as the storage medium 77 that is computer readable for making a computer implement the functions in the above embodiment.

In such a case, examples of a "storage medium" include a portable storage medium 146, such as CD-ROM, a flexible disk (or an MO disk, a DVD, a removable disk or the like), a storage medium which is detachable from a medium driving device 147, a storage unit 142 (such as a database or the like) in an external apparatus (such as a server or the like) to which data is transmitted via a network line 143, memory 145 (such as RAM or a harddisk or the like) in a main body 144 of an information processing apparatus 141, and the like. Programs stored in the portable storage medium 146 or the storage unit 142 are loaded onto the memory (such as RAM or a harddisk or the like) in the main body 144 to be executed.

In addition to those described above, various types of mass-storage media that will be developed in the future such as a Blu-ray Disc (registered trademark), a next-generation optical disk storage medium such as an AOD (Advanced Optical Disc) utilizing blue laser light, an HD-DVD9 utilizing red laser light, a Blue Laser DVD utilizing blue-violet laser light or the like can be used as the above described storage medium, such a CD-ROM, DVD-ROM or the like, in order to implement the present invention.

As has been described above, the embodiments can detect failures in programs highly accurately without bothering users or changing the program logic of the existing OS.

When a failure is detected in a program, information that is effective and highly accurate and thus can be used for the investigation of the cause of the failure can be collected so that the investigation is facilitated in order to save time for investigation and raise the success rate of finding the cause.

Further, the provision of a recovery program makes it possible to add a most appropriate recovery process in accordance with the location and content of a failure, and accordingly failure pattern data can be accumulated and the number of cases where automatic recovery is possible increase so that the tolerance of systems can improve.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A multi-processor system including processors, comprising:
   a failure state detection unit to detect a failure in an operating program and an interruption failure; and
   a recovery unit to determine, when the failure state detection unit has detected a failure, whether or not recovery of data involved in the failure is possible on the basis of content of the detected failure, and to recover the data when recovery is determined to be possible, wherein when the failure is detected, a processor in which the operating program is running requests a processor other than a processor in which the failure is detected to perform a recovery process; and an interruption failure is detected by comparing a time that has elapsed since exclusive control was obtained with a measured maximum value of the interruption prohibition time obtained and by comparing a time that has elapsed since obtainment of the exclusive control failed first with the measured maximum value of the interruption prohibition time obtained.

2. The system according to claim 1, wherein the failure state detection unit is to detect a failure in obtainment of exclusive control, and when a time period that has elapsed since obtainment of exclusive control equal or exceeds a specified value;

the operating program is determined to include a failure.

3. The system according to claim 2, wherein the failure state detection is to detect data used for generating the specified value when obtaining and cancelling the exclusive control.

4. The system according to claim 1, wherein the failure state detection unit is to detect an interruption failure as the detected failure, when a time period that has elapsed since interruption prohibition started equals or exceeds a specified value, the operating program is determined to involve a failure.

5. The system according to claim 4, comprising a collection unit to collect data used for generating the specified value when setting and cancelling the interruption prohibition.

6. The system according to claim 1, wherein data used for recovering data is prepared in advance, and when recovery of the data is possible by using the data prepared in advance for recovery of the data, the data is recovered.

7. The system according to claim 1, wherein the recovery unit is to extract, from the data, data that needs to be recovered, and by recovering the extracted data by using the data used for recovery.

8. The system according to claim 1, wherein a program used for recovering data is prepared in advance, and when recovery of the data is possible by using the program prepared in advance for recovery of the data, the data is recovered.

9. A method of detecting a failure and automatic recovery in a multi-processor system including processors, comprising:

detecting a failure in an operating program and an interruption failure;

determining, when the failure state detection step has detected a failure, whether or not recovery of data involved in the failure is possible on the basis of content of the detected failure, and recovering the data when recovery is determined to be possible, wherein when the failure is detected, a processor in which the operating program is running requests a processor other than a processor in which the failure is detected to perform a recovery process; and an interruption failure is detected by comparing a time that has elapsed since exclusive control was obtained with a measured maximum value of the interruption prohibition time obtained and by comparing a time that has elapsed since obtainment of the exclusive control failed first with the measured maximum value of the interruption prohibition time obtained.

10. A computer-readable storage medium storing a program executed in a multi-processor system including processors, causing the multi-processor system to implement:

a function of detecting a failure in an operating program and an interruption failure; and a function of determining, when the failure state detection function has detected a failure, whether or not recovery of data involved in the failure is possible on the basis of content of the detected failure, and for recovering the data when recovery is determined to be possible, wherein when the failure is detected, a processor in which the operating program is running requests a processor other than a processor in which the failure is detected to perform a recovery process; and an interruption failure is detected by comparing a time that has elapsed since exclusive control was obtained with a measured maximum value of the interruption prohibition time obtained and by comparing a time that has elapsed since obtainment of the exclusive control failed first with the measured maximum value of the interruption prohibition time obtained.

11. The computer-readable storage medium according to claim 10, wherein:

a failure in obtainment of exclusive control is also detected as the detected failure, and when a time period that has elapsed since obtainment of exclusive control equals or exceeds a specified value, the operating program is determined to include a failure.

12. The computer-readable storage medium according to claim 11, comprising:

collecting data used for generating the specified value when obtaining and cancelling the exclusive control.

13. The computer-readable storage medium according to claim 10, comprising:

collecting data used for generating the specified value when setting and cancelling the interruption prohibition.

14. The computer-readable storage medium according to claim 10, wherein:

data used for recovering data is prepared in advance, and when recovery of the data is possible by using the data prepared in advance for recovery of the data, the data is recovered.

15. The computer-readable storage medium according to claim 10, wherein:

the recovery is performed by extracting, from the data, data that needs to be recovered, and by recovering the extracted data by using the data used for recovery.

16. The computer-readable storage medium according to claim 10, wherein:

a program used for recovering data is prepared in advance, and when recovery of the data is possible by using the program prepared in advance for recovery of the data, the data is recovered.

17. The computer-readable storage medium according to claim 16, wherein:

when there is a link between pieces of data to be recovered, the program used for recovering the data recovers the data by tracing the link.

18. The computer-readable storage medium according to claim 10, wherein:

when a result of the determination indicates that recovery is impossible, the system is shut down.

* * * * *